(12) United States Patent
Solow

(10) Patent No.: US 6,430,814 B1
(45) Date of Patent: Aug. 13, 2002

(54) FLEXY RAZOR USING FINGER-ASSISTED BENDING

(76) Inventor: Terry S. Solow, 624 De Luz Rd. #13, Fallbrook, CA (US) 92028

( * ) Notice: Subject to any disclaimer, the term of this patent is extended or adjusted under 35 U.S.C. 154(b) by 0 days.

(21) Appl. No.: 09/332,797

(22) Filed: Jun. 14, 1999

(51) Int. Cl.[7] .............................................. B26B 21/00
(52) U.S. Cl. .................................. 30/47; 30/49; 30/50
(58) Field of Search ................................ 30/47, 49, 50

(56) References Cited

U.S. PATENT DOCUMENTS

| | | | | |
|---|---|---|---|---|
| 2,582,176 A | * | 1/1952 | Stover | 30/49 |
| 4,483,068 A | * | 11/1984 | Clifford | 30/49 |
| 4,498,235 A | * | 2/1985 | Jacobson | 30/47 |
| 4,720,917 A | * | 1/1988 | Solow | 30/49 |
| 4,837,930 A | * | 6/1989 | Righi | 30/47 |
| 4,854,043 A | * | 8/1989 | Chen | 30/49 |
| 4,942,662 A | * | 7/1990 | Radcliffe | 30/49 |
| 4,976,028 A | * | 12/1990 | Chen | 30/49 |
| 4,993,154 A | * | 2/1991 | Radcliffe | 30/49 |
| 5,003,694 A | * | 4/1991 | Chen | 30/49 |
| 5,182,858 A | * | 2/1993 | Chen | 30/49 |

* cited by examiner

*Primary Examiner*—M. Rachuba

(57) ABSTRACT

This invention is directed to various flexible-blade razors whose flexing and bending are assisted by the user's fingers These novel, flexible-blade razors are able to bend as deeply as required in order to conform to and closely shave convex, concave or flat surfaces of the body, in a single, full-width, shaving stroke.

33 Claims, 10 Drawing Sheets

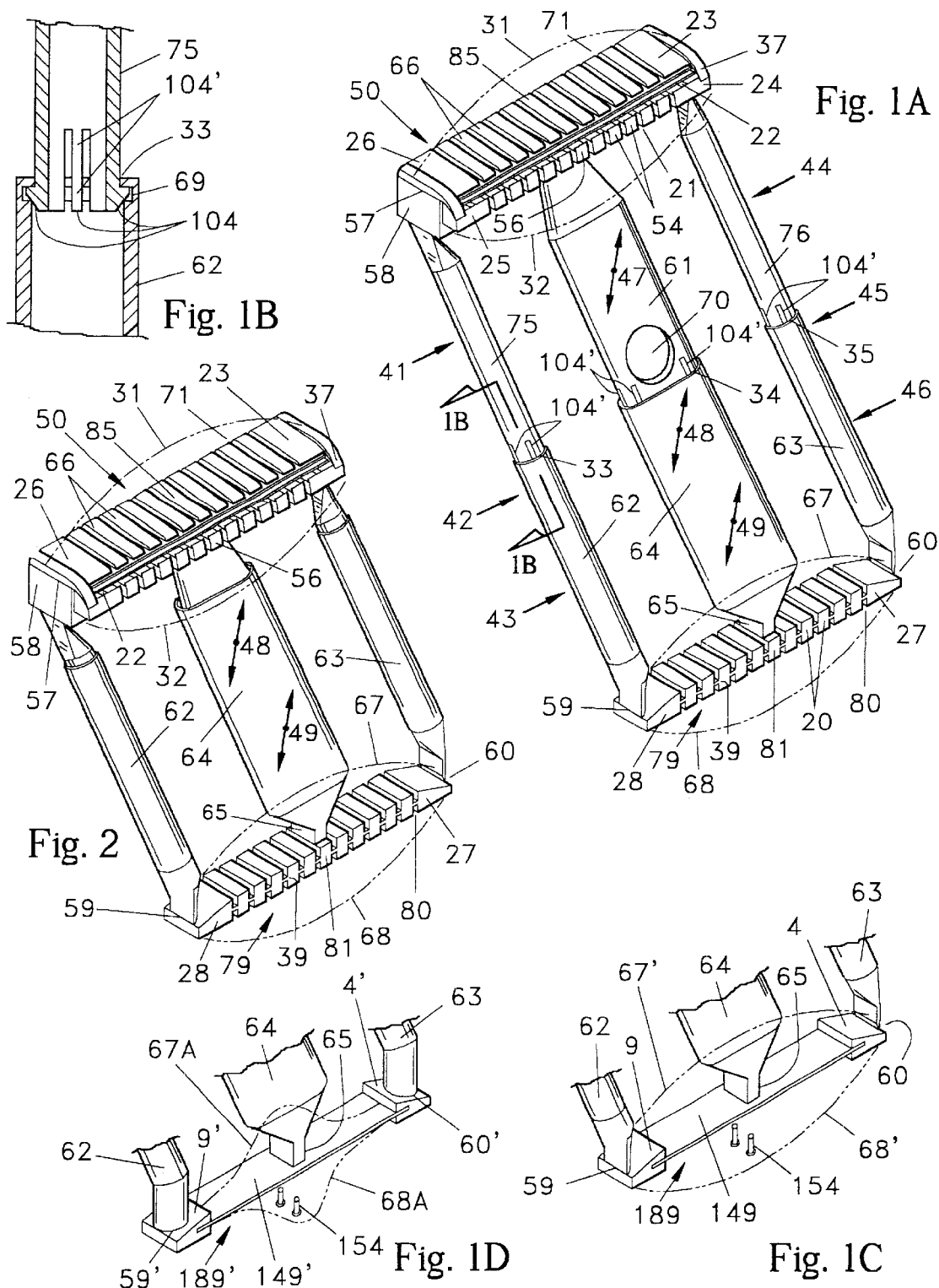

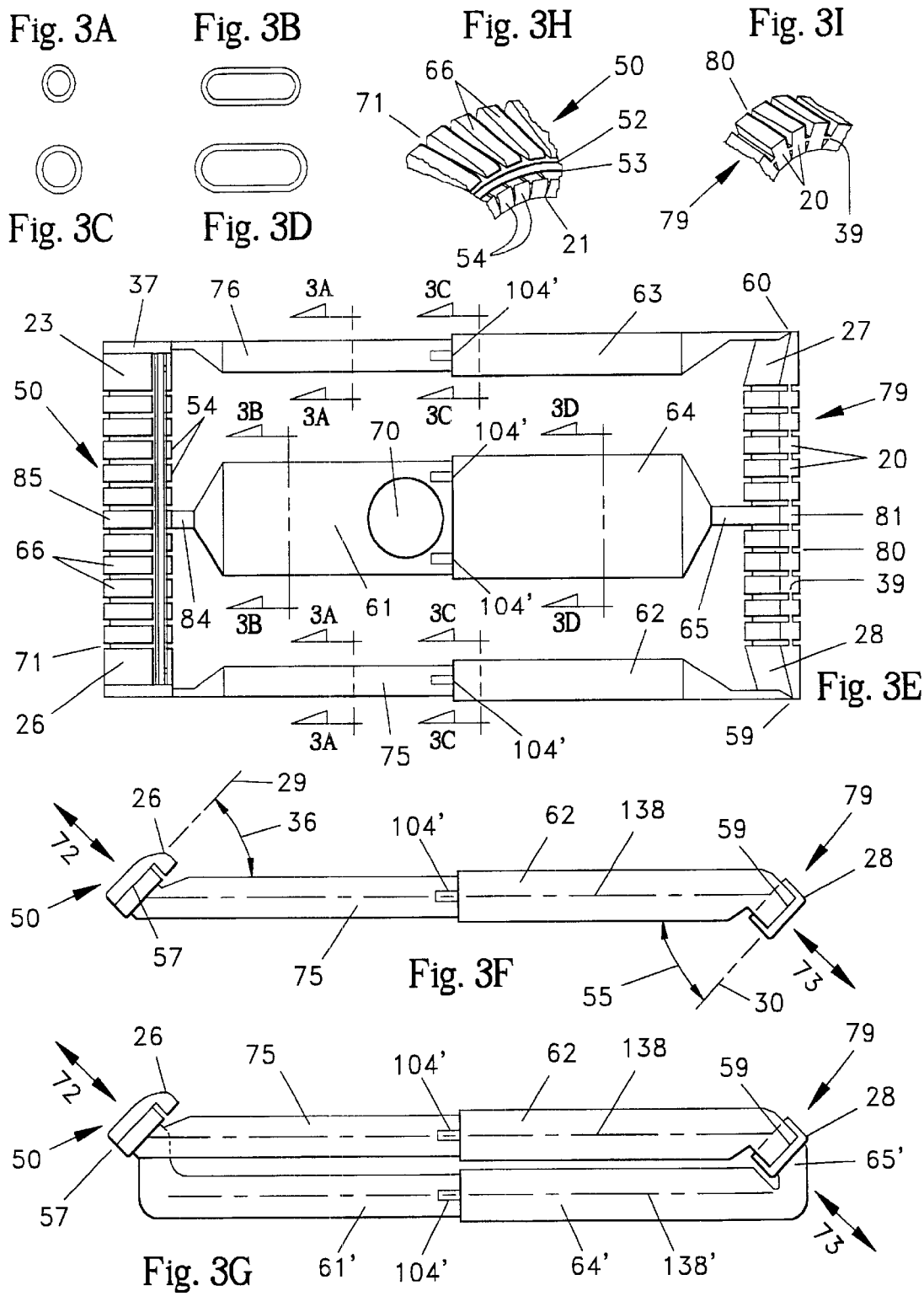

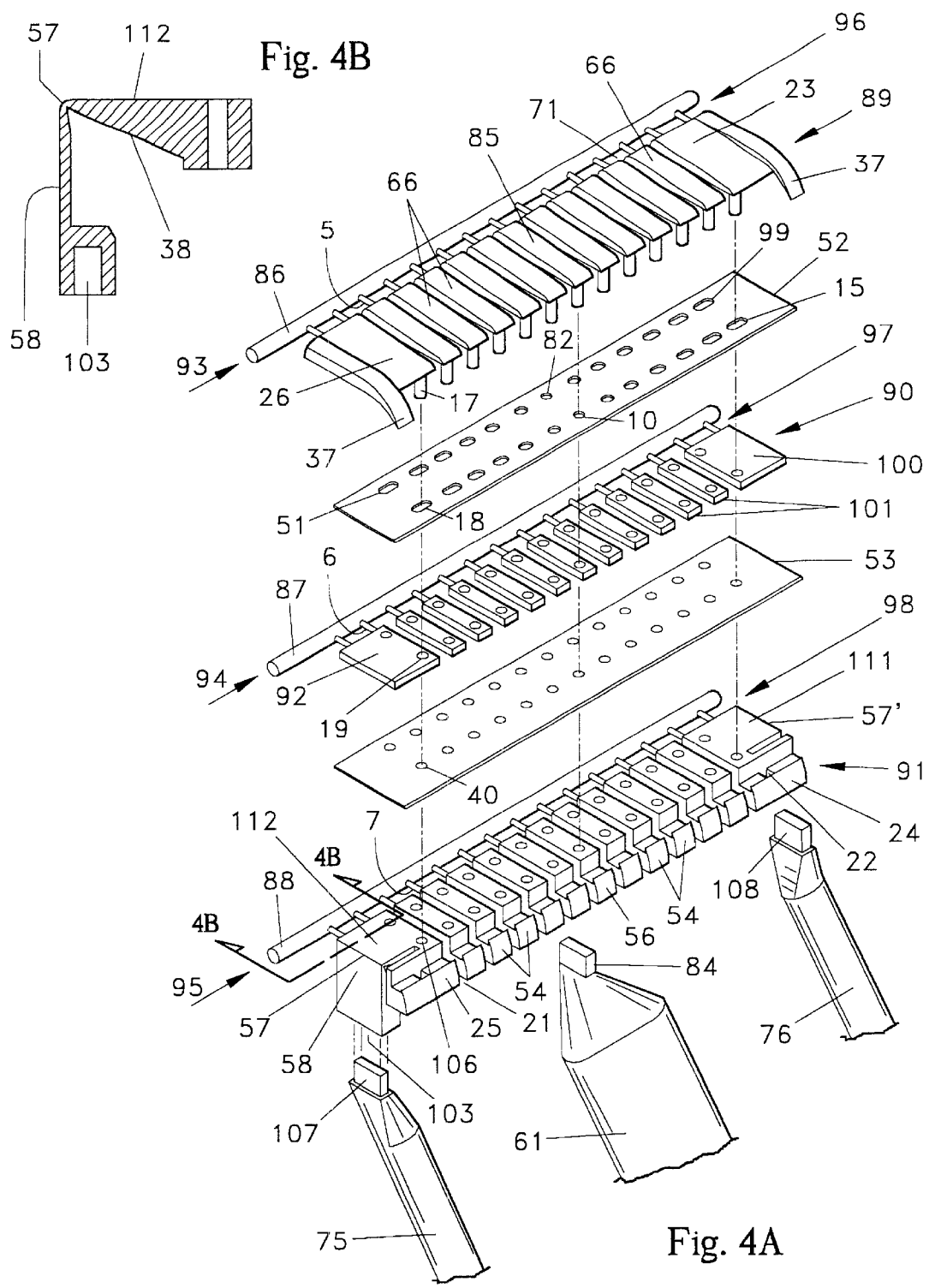

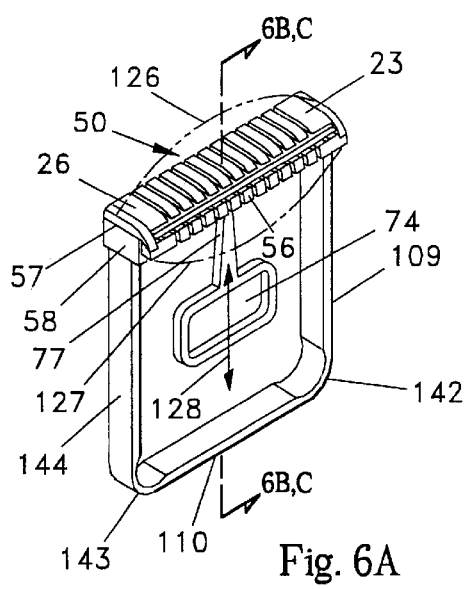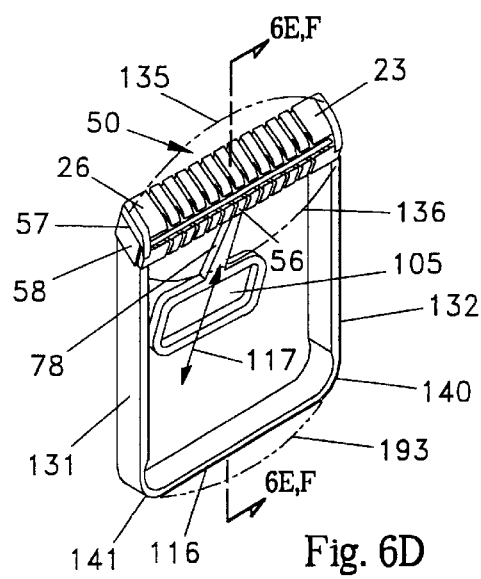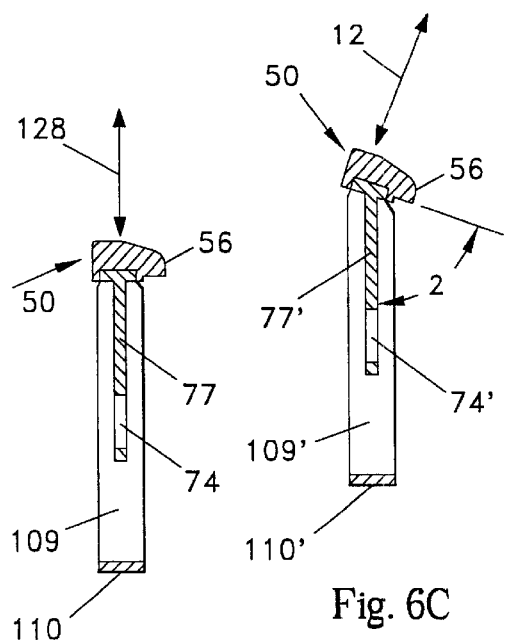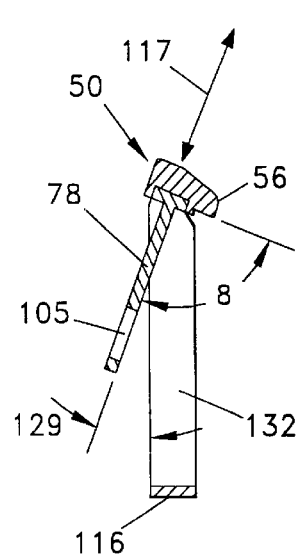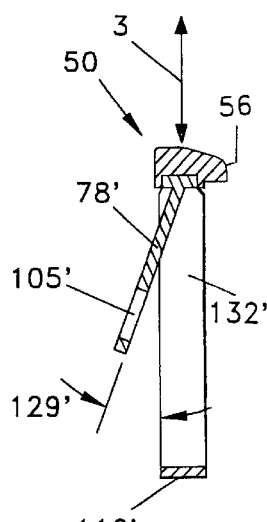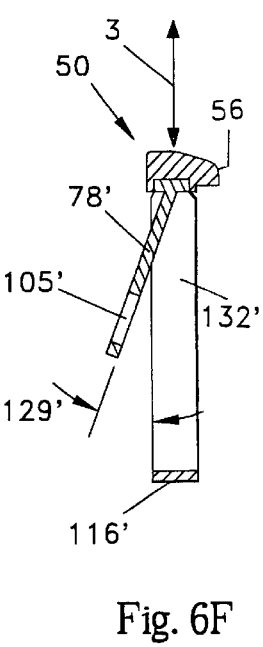
Fig. 6A
Fig. 6D
Fig. 6B
Fig. 6C
Fig. 6E
Fig. 6F

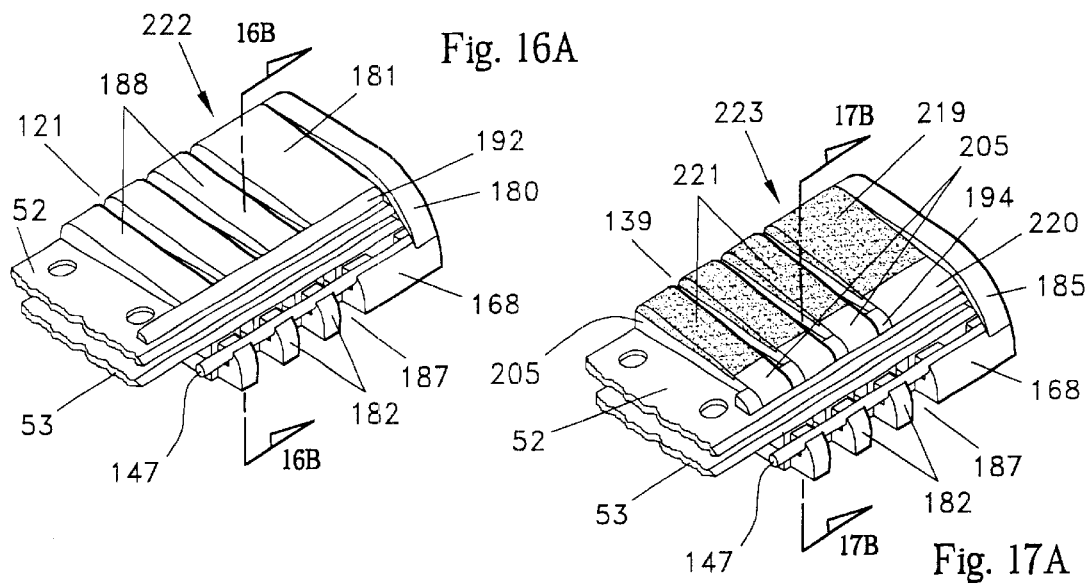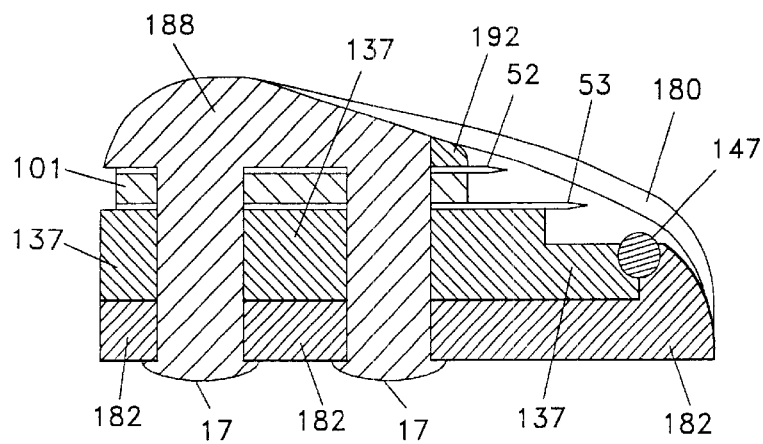

FLEXY RAZOR USING FINGER-ASSISTED BENDING

BACKGROUND—FIELD OF THE INVENTION

This invention relates to flexible-blade razors that are able to closely shave steeply curved convex or concave surfaces, as well as flat surfaces of the body, in a single, full-width shaving stroke by employing finger-assisted razor-bending by the user.

BACKGROUND—DESCRIPTION OF THE PRIOR ART

The following discusses flexible-blade razor Prior Art, wherein the user employs finger-assisted razor-bending to shave convex, concave or flat surfaces of the body.

When one tries to employ Prior Art teachings to build a finger-assisted flexible-blade razor to shave steeply curved convex or concave surfaces, certain problems and disadvantages become apparent, as follows:

(a) For example, U.S. Pat. No. 4,720,917 to Solow (1988) describes a flexible-blade razor configuration whose bending may be finger-assisted by the user. This configuration is shown in FIG. 9 and is discussed on page 4 of said 1988 patent. The curved ribs shown in said FIG. 9 are fixedly attached to a non-bending, rear rib-anchor located at the back ends of said ribs and to a flexible razor head located at the front ends of said ribs. Said FIG. 9 configuration works satisfactorily on gently curved convex or concave surfaces that require only a small amount of razor bending. However, if for example, the user tries to shave a steeply curved convex surface by pushing on the two curved outer-ribs, the maximum bending of said FIG. 9 razor configuration (in said 1988 patent) is limited to the extended length of the two fully unbent outer-ribs. If the user tries to bend the razor beyond this point, then these outer-ribs have a tendency to buckle and thereby interrupt the bending. Conversely, trying to solve this problem by initially adding even more curvature to the ribs makes the ribs too difficult to finger-control.

(b) Because the flexible razor ribs of FIG. 9 of said 1988 patent must be flexible and springy, the user's controlling fingertips must be positioned on said ribs very near to where they connect to the flexible razor head in order for the user to achieve proper bending control without said ribs buckling. However, this feature exposes the user's fingertips to where they are likely to be contaminated with expended shaving cream and hair shavings that flow through or over said flexible razor head during shaving. This unwanted fingertip contamination would be uncomfortable and therefore, unacceptable to some users.

(c) The flexible razor configuration of FIG. 9 of said 1988 patent is not collapsible for compact shipping or for compact storage when not in use.

OBJECTS AND ADVANTAGES

Several objects and advantages of the present invention are as follows:

(a) To provide a flexible razor that is capable of shaving convex, concave or flat body surfaces with ease, regardless of how steeply curved or gently curved those body surfaces may be.

(b) To provide a flexible razor whose bending or flexing may be easily finger-controlled by virtually any user, regardless of how skillful that user may or may not be.

(c) To provide a flexible razor, wherein the user's fingertips will not be contaminated by expended shaving cream and hair shavings during shaving.

(d) To provide a low-cost, flexible razor that is easily and instantly collapsible or opened via telescopic ribs for compact shipping and for compact user storage when not in use.

BRIEF DESCRIPTION OF THE DRAWINGS

In the drawings, closely related Figures have the same Figure number but different alphabetic suffixes.

FIG. 1A shows a perspective view of one embodiment of this invention, showing a flexible razor with its three, parallel, telescopic ribs fully opened and ready for use. The center-rib shows an optional finger-grip-hole for finger-assisted razor bending.

FIG. 1B shows a cross-sectional view of one telescopic-rib-joint of the three telescopic ribs shown in FIG. 1A, showing a simple mechanism for controlling the opening, closing and holding-open of each of said three ribs of FIG. 1A.

FIG. 1C shows a perspective view of a bottom portion of FIG. 1A, showing an alternative, flexible rib-anchor.

FIG. 1D shows a perspective view of a bottom portion of FIG. 1A, showing a second, alternative, flexible rib-anchor with rigid connections to the three ribs of FIG. 1A.

FIG. 2 shows a perspective view of the same embodiment shown in FIG. 1A, but with its three, telescopic ribs fully closed.

FIGS. 3A to 3D show various cross-sectional views of the three parallel ribs of the flexible razor embodiment shown in FIG. 3E.

FIG. 3E shows an elevational view of the embodiment shown in FIG. 1A.

FIG. 3F shows a side view of the elevational view shown in FIG. 3E, which also shows that the three, straight, parallel ribs shown in said FIG. 3E are all in one plane.

FIG. 3G shows a variation of the embodiment shown in FIG. 3F, showing a center-rib that is offset and thus, outside of said plane of said ribs described for FIG. 3F.

FIG. 3H shows a perspective view of a breakaway portion of the flexible razor head shown in FIGS. 1A and 3E, illustrating the built-in bending-stops that limit the maximum amount of bending of said flexible razor head.

FIG. 3I shows a perspective view of a breakaway portion of the flexible rib-anchor shown in FIGS. 1A and 3E, illustrating the built-in bending stops that limit the maximum amount of bending of said flexible rib-anchor.

FIG. 4A shows an exploded view of the flexible razor head shown in FIG. 1A.

FIG. 4B shows a cross-sectional view of an end-portion of the flexible razor head's base-member, as originally designated in FIG. 4A.

FIG. 6A shows a perspective view of another embodiment of this invention, showing a flexible razor with a wide finger-grip-loop located in the center-arm.

FIG. 6B shows a cross-sectional view of FIG. 6A, showing the path that the flexible razor head travels within the plane of the handle-body during razor flexing. The flexible razor head in this configuration is perpendicular to the plane of the handle-body.

FIG. 6C shows an alternate cross-sectional view of FIG. 6A, which is similar to FIG. 6B but with the flexible razor head at a new chosen angle with respect to the center-arm.

FIG. 6D shows a perspective view of a variation of FIG. 6A, showing a new angular position of the center-arm.

FIG. 6E shows a cross-sectional view of FIG. 6D, showing the center-arm at a chosen angle with respect to the plane of the handle-body, as well as showing the razor head at a chosen angle with respect to the center-arm.

FIG. 6F shows an alternate, cross-sectional view of FIG. 6D, which shows a razor head that is perpendicular to the plane of the handle-body, as well as showing a center-arm at a chosen angle to the plane of the handle-body.

FIG. 10B was originally designated in FIG. 10A.

FIG. 12B shows narrow guard-bar tips, while the analogous FIG. 5B shows wide guard-bar tips.

FIG. 13 was originally designated in FIG. 12A.

FIG. 16A shows another embodiment of this invention, showing a portion of a flexible razor head similar to FIG. 12A but with an added long, thin, rubbery, rod-like caps'-guard-web, as originally shown in FIG. 14C.

FIG. 16B shows a cross-sectional view of one of a plurality of blade-holder-housings, originally designated in FIG. 16A.

FIG. 17A shows another embodiment of this invention, showing a portion of a flexible razor head, similar to FIG. 16A, but with added multiple, lubrication strips and a plurality of tiny, rubbery sub-caps'-pads. Said sub-caps'-pads are an alternative substitution for the long, thin, rubbery, rod-like caps'-guard-web, originally shown in FIGS. 14C, 16A, and 16B.

FIG. 17B shows an off-center, sectional, side view of one of a plurality of blade-holder-housings. Also shown are cross-sectional views of a tiny, rubbery sub-caps'-pad and of a long, round, flexible, slidable, rod-like guard-bar-web. FIG. 17B was originally designated in FIG. 17A.

DETAILED DESCRIPTION OF FIGS. 1A THROUGH 5B

Figure 5A:
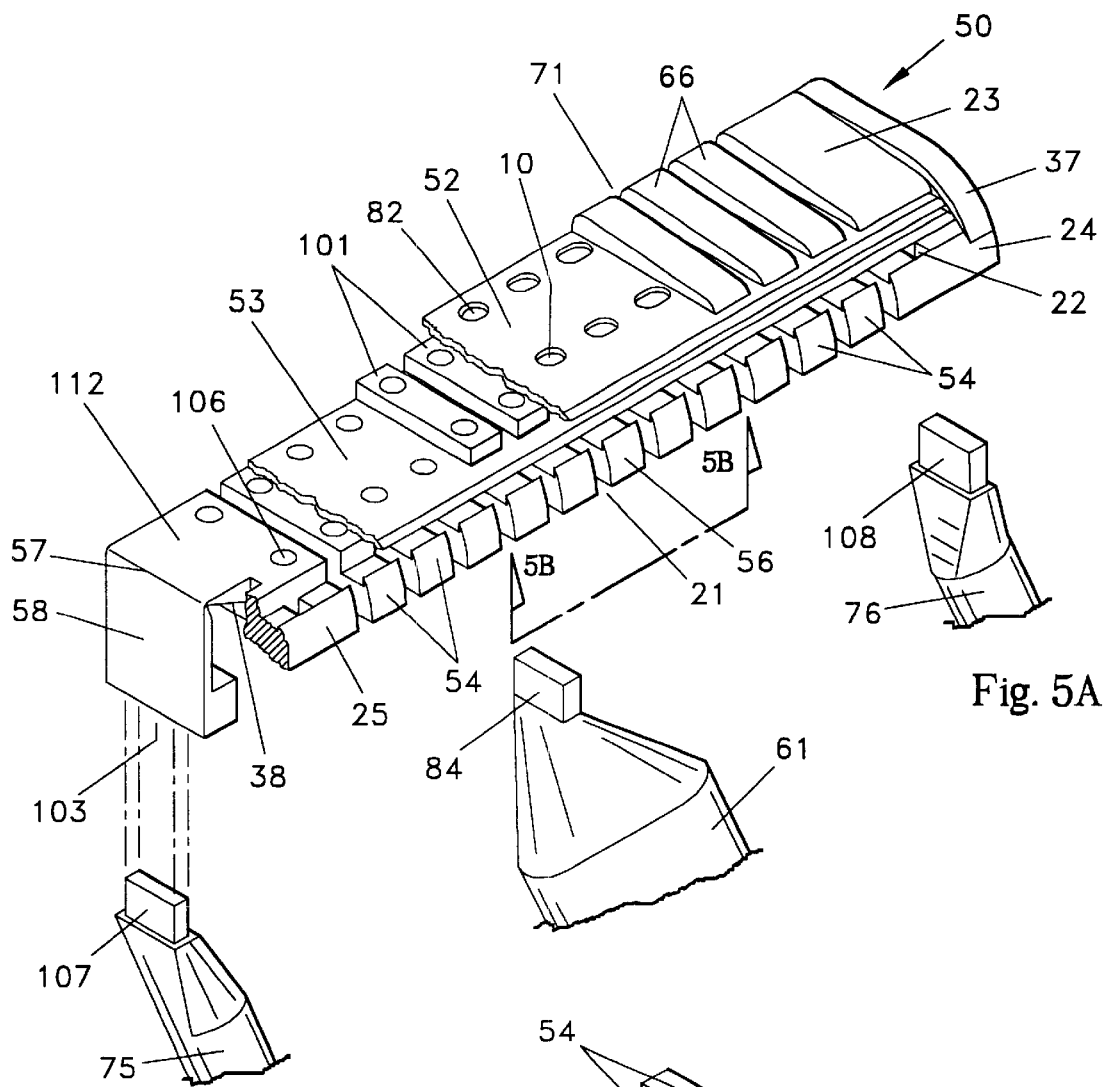
FIG. 5A shows a perspective view of a fully assembled flexible razor head of the exploded view shown in FIG. 4A, with portions broken away to show the internal construction.

FIG. 1A shows a perspective view of one flexible razor embodiment of this invention, which includes three, parallel, telescopic ribs. The rib shown on the left consists of a top, outer-rib section 75, which mates with a hollow, bottom, outer-rib section 62, via opening 33. This mated, telescopic combination shall be known hereinafter as outer-rib 75/62. The rib shown in the center consists of a top, center-rib section 61, which mates with a hollow, bottom, center-rib section 64 via opening 34. This mated, telescopic combination shall be known hereinafter as center-rib 61/64. The rib shown on the right consists of a top, outer-rib section 76, which mates with a hollow, bottom, outer-rib section 63 via opening 35. This mated, telescopic combination shall be known hereinafter as outer-rib 76/63.

Said three, parallel, telescopic ribs connect to a flexible razor head 50, at the top end of the flexible razor and to a flexible rib-anchor 79, at the bottom end of the flexible razor, as shown in FIG. 1A.

The bottom of outer-rib 75/62 is connected to end-housing 28 of flexible rib-anchor 79 via living-hinge 59, while the top of said outer-rib 75/62 is connected to flexible razor head 50 via living-hinge 57. Also, refer to FIG. 5A for a clear picture of how the top of rib-section 75 connects to living-hinge 57 via rib-section-tip 107, cavity 103 and living-hinge side-wall 58. Additionally, FIG. 5A shows the position of other components, including blades 52 and 53.

The bottom of the other outer-rib 76/63 in FIG. 1A is connected to the other end-housing 27 of flexible rib-anchor 79 via living-hinge 60, while the top of said outer-rib 76/63 is connected to flexible razor head 50 via living-hinge 57' (not visible in FIG. 1A) in an analogous manner to that described for outer-rib 75/62 in the preceding paragraph. However, FIG. 4A does show the top of the hinge-axis of said living-hinge 57', which is part of end-sub-base 111.

Figure 5B:
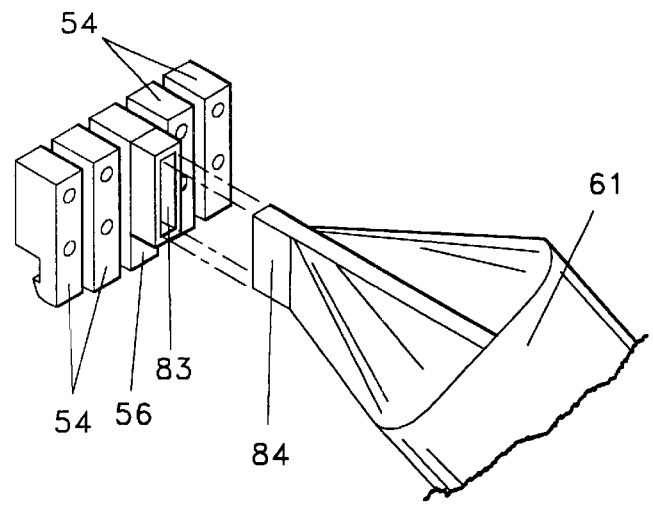
FIG. 5B shows a perspective view of a bottom, center portion of a fully assembled flexible razor head, as originally designated in FIG. 5A.

The bottom tip of center-rib 61/64, labeled 65 in FIG. 1A, is glued to the center sub-housing 81 of a row of sub-housings 20 of flexible rib-anchor 79. Said sub-housings 20 and 81 are interconnected by plastic, flexible living-hinge-webs or strips 39. Sub-housings 20 and 81 are separated from one another by spaces or gaps 80, wherein the width of each gap 80 preferably equals the width of each interconnecting living-hinge-web 39. Alternatively, said living-hinge-webs 39 may each be V-shaped, U-shaped, S-shaped, etc. The top tip of center-rib 61/64, labeled 84 and shown best in FIGS. 3E, 5A and 5B, may be glued into the rectangular cavity 83, which is located on the bottom of sub-base 56. Thus, said center-rib 61164, which is shown best in FIGS. 1A, 3E and 5B, is fixedly connected to razor head 50 and to flexible rib-anchor 79.

Razor head 50 in FIGS. 1A and 2 shows multiple sub-caps 66 and center-sub-cap 85 that are each spaced apart from one another by multiple gaps 71. End-sub-caps 23 and 26 are wider than individual sub-caps 66 and 85. Blade-corner-guards 37 prevent the skin from touching the sharp corners of the blades. Multiple guard-bars 54 and center-guard-bar 56 plus wider, end-guard-bars 24 and 25 are separated from one another by multiple gaps 21.

The user may grasp the flexible razor shown in FIG. 1A from the back side, with the flexible rib-anchor 79 resting across the palm of the right hand and the cutting edges of the blades facing away from the hand. The user's thumb may rest on outer-rib 76/63, in the area of arrows 44, 45 or 46. The user's index finger may fit into finger-grip-hole 70, located in the center-rib 61/64. The user's remaining fingers may rest on outer-rib 75/62, in the area of arrows 41, 42 or 43.

When the user pushes the center-rib's finger-grip-hole 70 towards the razor head 50, in a direction shown by upper arrows 47, 48 and 49, it forces razor head 50 to bend upwards in a direction perpendicular to the plane of the blades as shown by the dashed line 31. In lock-step, rib-anchor 79, in a simultaneous and similar manner, is forced to bend upwards by center-rib 61/64, in a direction perpendicular to the plane of said webs or strips 39, as shown by dashed line 67. It is noted that the plane of the blades of razor head 50, and the plane of said webs or strips 39 of rib-anchor 79 are parallel to each other, as shown best in FIGS. 1A and 3F.

Conversely, when the user pulls finger-grip-hole 70 away from razor head 50, in a direction shown by lower arrows 47, 48 and 49, it forces razor head 50 to bend downwards, perpendicular to the plane of the blades as shown by dashed line 32. In lock-step, rib-anchor 79, in a simultaneous and similar manner, is forced to bend downwards by center-rib 61/64, in a direction perpendicular to the plane of said webs or strips 39, as shown by dashed line 68.

FIG. 1B shows a cross-sectional view of a telescopic-joint located inside opening 33 of outer-rib 75/62 of FIG. 1A, as originally designated in FIG. 1A. Similar telescopic-joints are located inside opening 35 of outer-rib 76/63 and inside opening 34 of center-rib 61/64 of FIG. 1A. As shown in said FIG. 1B, the bottom of top, outer-rib section 75 has four cams 104 molded into it, wherein each cam has a ninety-degree, angular spacing from each neighboring cam. Each cam 104 is molded into the end of a miniature cantilever-beam 104'.

Top, outer-rib section 76 is constructed in a similar manner to that described above for said top, outer-rib section 75, as shown best in FIGS. 1A and 4A, with additional reference to FIG. 1B. Top, center-rib section 61 is also constructed in a similar manner to said top, outer-rib section 75, described above. However, said center-rib has six miniature cantilever-beams 104' that are spaced so that there are three of said beams on each side of said center-rib. This is shown best in FIGS. 1A, 3E and 3G. Also, refer to the discussion for FIG. 3G below.

To assemble the telescopic ribs, the bottom of top, outer-rib section 75 is pushed through opening 33 of the top of bottom, outer-rib section 62, as shown in FIGS. 1A and 1B. This action depresses cams 104 via the bending of miniature cantilever-beams 104', and the cam edges then snap into place into circular, concentric notch 69, as shown in FIG. 1B. In a similar manner, the bottom of top, outer-rib section 76 is pushed through opening 35 of the top of bottom, outer-rib section 63. Additionally, in a similar manner, the bottom of top, center-rib section 61 is pushed through opening 34 of the top of bottom, center-rib section 64. Thus, the locked, fully open position of all three telescopic ribs is shown in FIGS. 1A, 1B and 3E.

If the user now wishes to close said three telescopic ribs, the user simply pushes the entire, flexible rib-anchor 79 towards the flexible razor head 50. This causes the tips of cams 104 to depress and snap out of concentric notch 69 of FIG. 1B. To create a solid feel, the tips of cams 104 then provide some friction by rubbing against the inside wall of bottom, outer-rib section 62 until the telescopic outer-rib 75/62 is fully closed. This same process is repeated simultaneously for outer-rib 76/63 and for center-rib 61/64 as shown in FIG. 1A.

FIG. 1C shows a perspective view of a bottom portion of FIG. 1A, showing an alternative flexible rib-anchor 189 versus flexible rib-anchor 79 shown in FIG. 1A. Flexible rib-anchor 189 is comprised of a long, thin, springy, narrow strip 149 of metal or plastic that is glued on opposite ends to end-housings 9 and 4. The tip 65 of bottom, center-rib section 64 is either glued to or attached to the center region of said strip 149 via screws 154. Bottom, outer-rib sections 62 and 63 are connected to said end-housings 9 and 4 via living-hinges 59 and 60, in a similar manner to that described earlier for flexible rib-anchor 79 for FIG. 1A. During razor flexing, said flexible rib-anchor 189 moves in a path outlined by dashed lines 67' and 68', which is also similar to that described earlier for said flexible rib-anchor 79 of FIG. 1A.

The flexible razor with fully open telescopic ribs shown in FIG. 1A is the most preferred embodiment of this invention, wherein finger-grip-hole 70 is optional.

FIG. 1D shows a perspective view of a bottom portion of FIG. 1A, showing a second, alternative, flexible rib-anchor 189' versus said alternative, flexible rib-anchor 189 shown in FIG. 1C. Flexible rib-anchor 189' of FIG. 1D is comprised of a long, thin, springy, extra supple, narrow strip 149' of metal or plastic that is glued on opposite ends to end-housings 9' and 4'. The tip 65 of bottom, center-rib section 64 of FIG. 1A is either glued to or attached to the center region of said strip 149' via screws 154. During razor flexing, flexible rib-anchor 189' of FIG. 1D moves in a path outlined by dashed lines 67A and 68A, wherein the shape of said dashed lines is somewhat different from the dashed lines shown in said FIG. 1C. The reason for this starts with said flexible rib-anchor 189 in said FIG. 1C, which has living-hinges 59 and 60 on each of its ends that connect it to bottom, outer-rib sections 62 and 63. In contrast, flexible rib-anchor 189' in FIG. 1D has no living-hinges, but each of its opposite ends is glued to end-housings 9' and 4', wherein said end-housings are fixedly glued to bottom, outer-rib sections 62 and 63 at points 59' and 60'. Thus, dashed lines 67A and 68A display the shapes shown in said FIG. 1D, wherein said strip 149' must be extra supple in order to easily bend far enough to make up for the lack of living-hinges.

It is important to note that for improved finger-gripping comfort or improved razor-head-bending symmetry, the present embodiment shown in FIG. 1A may be modified implementing any of the following Options:

In Option #1, wide center-rib 61/64 may be made much narrower after deleting finger-grip-hole 70 of FIG. 1A. At least two copies of said narrower center-rib may be fixedly installed in a parallel, side-by-side manner, in place of, and in a similar way to said present, wide, fixedly installed center-rib 61/64 of FIG. 1A.

In Option #2, at least one additional rib, similar to outer-rib 76/63, may be installed between said outer-rib 76/63 of FIG. 1A and a new, narrow center-rib that is similar to said narrower center-rib described in Option #1 above. This forms a modified FIG. 1A.

In Option #3, a new, added rib, similar to outer-rib 75/62 may be installed between said outer-rib 75/62 of FIG. 1A and a new, narrow center-rib that is similar to that described in Option #1 above. This forms an alternate, modified FIG. 1A.

If Options #2 and #3 were both implemented in a modified FIG. 1A, we would then have one, new, narrow center-rib plus four similar outer-ribs, wherein all five ribs are parallel and in one plane and each rib is attached between flexible rib-anchor 79 and flexible razor head 50, as described above. Each of said four outer-ribs has a living-hinge on each of its outer-ends for a total of eight living-hinges. Said new, narrow center-rib is fixedly attached between said flexible rib-anchor 79 and said flexible razor head 50, similar to the way the original center-rib 61/64 of FIG. 1A was fixedly attached.

FIG. 2 shows a perspective view of the same embodiment shown in FIG. 1A, but with its three, telescopic ribs fully closed. It is noted that the flexible razor with closed telescopic ribs shown in FIG. 2 is also fully operational, even with said telescopic ribs fully closed, and may be preferred by some people who insist on shaving with a more compact flexible razor than that shown in FIG. 1A.

It is important to note when shaving convex or concave body surfaces with the flexible razor shown in FIG. 1A that it is perfectly acceptable for the user to ignore optional finger-grip-hole 70 and simply use the fingers to push center-rib 61/64 either above or below the plane of outer-ribs 75/62 and 76/63, in either bending direction, as shown by dual-headed arrows 47, 48 and 49. For shaving flat body surfaces, the user may simply use the fingers to hold center-rib 61/64 in the same plane as outer-ribs 75/62 and 76/63, so that razor head 50 is straight and unbent.

It is also noted, as shown in FIG. 1A, that making the center-rib 61/64 significantly wider than either outer-rib 75/62 or 76/63 provides means to enable easier finger-manipulation of said center-rib in order to bend said flexible razor during shaving.

Alternatively, once a flexible razor bending procedure, similar to that described in the second, preceding paragraph, or any other bending procedure, has been even slightly started in either bending direction, it is noted that the flexible razor shown in FIG. 1A may have its bending further assisted by the user who may finger-squeeze outer-ribs 75/62 and 76/63 towards each other, as shown by arrows 41, 42, 43 on the left and arrows 44, 45, 46 on the right. Alternatively, it is also noted that gently pushing the flexible razor head against a convex surface will also start said bending procedure. Additionally, it is noted that said finger-squeeze, bending procedure is alternative and not mandatory. It is also noted that said alternative, finger-squeeze, bending procedure may also be similarly employed in FIGS. 2, 3, 6, 7, 9 and 15.

When shaving convex, concave or flat body surfaces with the flexible razor shown in FIG. 2 whose three telescopic ribs are fully closed, the user may use a finger-assisted, bending procedure similar to that described earlier for FIG. 1A, which ignored the optional finger-grip hole 70 in said FIG. 1A.

It is noted, when the three ribs are in the resting position, as shown best in FIGS. 1A, 3F and 3E, with razor head 50 straight and unbent, that it is not mandatory for said three ribs to be in the same plane. For example, the center-rib 61/64, for styling purposes or gripping comfort, could be fabricated to have a new resting position outside the plane of the two outer-ribs 75/62 and 76/63 without adversely affecting the functioning of said flexible razor. One example of said new resting position is shown in FIG. 3G as center-rib 61'/64' and is discussed for FIG. 3G below.

FIGS. 3A through 3F show further views of the same flexible razor embodiment shown in FIG. 1A and are explained as follows:

FIGS. 3A and 3C show cross-sectional views of telescopic outer-ribs 75/62 and 76/63, as originally designated in FIG. 3E. FIGS. 3B and 3D show cross-sectional views of telescopic center-rib 61/64, as originally designated in FIG. 3E.

FIG. 3E shows an elevational view of the flexible razor embodiment shown in FIG. 1A.

FIG. 3F shows a side view of the elevational view shown in FIG. 3E, which employs three, straight, parallel ribs. Said side view, as outlined by outer-rib 75/62, shows that all three of said straight, parallel ribs are in one plane. Center-line 138 shows that razor head 50 and rib-anchor 79 are also in said same, one plane.

By referring to FIGS. 3F, 1A and 5A, one can get a clear picture of the flexing-movement path of razor head 50 shown by arrows 72 and the flexing-movement amplitudes shown by dashed lines 31 and 32 of said razor head 50. In comparison, one can get a clear picture of the simultaneous, similar, flexing-movement path shown by arrows 73 and the flexing-movement amplitudes shown by dashed lines 67 and 68 of flexible rib-anchor 79. It is important to note that the plane of the blades in razor head 50, as shown in FIG. 3F by dashed line 29, is parallel to the plane of webs or strips 39 of flexible rib-anchor 79, as shown by dashed line 30. This means that angle 36, showing the angle of the plane of blades 52 and 53 versus the plane of the three, straight, parallel ribs, equals angle 55, showing the angle of the plane of said webs 39 versus the plane of the same, three, parallel ribs. The plane of the blades 52 and 53 is shown best in FIG. 5A. Thus, the hinge-axis of each of the four living-hinges 59, 60, 57 and 57' discussed for FIGS. 1A, 3F, 3E and 4A are all parallel to each other.

FIG. 3G shows another embodiment of this invention, with a different side-view of FIG. 3E, showing an offset position for new center-rib 61'/64', as shown by center-line 138'. Said new center-rib 61'/64' is mounted into position, as shown in FIG. 3G, in a similar manner to the way center-rib 61/64 was mounted into position, as was discussed earlier for FIG. 1A. However, referring to FIGS. 3G, 3E and 1A, one difference is that said new center-rib 61'/64' has its bottom tip 65' glued to the back of sub-housing 81 of rib-anchor 79 instead of to its front, for construction-simplicity reasons. It is noted that the center-rib 61/64, as shown best in FIGS. 1A, 1C and 3E, can be located anywhere within a three-dimensional region between outer-ribs 75/62 and 76/63, as further explained by the following two examples and comments:

As a first example, FIGS. 1A, 3F and 3E show that the three ribs are all in one plane, wherein said center-rib 61/64 is located equidistant from each of said outer-ribs 75/62 and 76163. However, said center-rib can also be located off-center, so as to be closer to one outer-rib and farther away from the other outer-rib, while still remaining in said same plane as said two outer-ribs.

As a second example, FIGS. 3G and 3E show center-rib 61'/64' in an offset position outside the plane of said two outer-ribs 75/62 and 76/63, but still equidistant from each of said two outer-ribs. However, said center-rib 61'/64' can also be located closer to one outer-rib and farther away from the other outer-rib, while still remaining outside of the plane of said two outer-ribs.

In any event, the bottom of said center-rib is always connected to flexible rib-anchor 79 at a point anywhere between the points where said outer-ribs are connected to said flexible rib-anchor. Additionally, the top of said center-rib is always connected to the flexible, razor head 50 at a point that is anywhere between the points where said outer-ribs are connected to said flexible, razor head. However, it is important to note the following:

(a) FIGS. 1A, 2 and 3E show that center-rib 61/64 is located in a centered position by being connected to razor head 50 at a point that is equidistant from each point where each outer-rib 75/62 and 76/63 is connected to said razor head 50.

(b) Said centered position of said center-rib causes the flexing outline shape of razor head 50 to be perfectly symmetrical, when comparing the shape of the left half of said dashed line 31 with the shape of the right half of said dashed line 31, as shown in FIG. 1A. In an analogous manner, this perfect symmetry also applies to the left and right halves of dashed line 32 in said FIG. 1A.

(c) However, if said center-rib is connected to said razor head 50 at a point that is closer to one outer-rib and farther away from the other outer-rib, then said flexing, outline shape of each of dashed lines 31 and 32 will become asymmetrical.

(d) Thus, the farther away from said centered position that said center-rib is connected to said razor head 50, the more asymmetrical will be said flexing, outline shape of said razor head 50.

FIG. 3H shows a perspective view of a breakaway portion of the flexible razor head 50, originally shown best in FIG. 1A, but with said breakaway portion bent as far as possible in one direction, wherein the side-edges of sub-bases 54 now touch each other and normal spacing 21, originally shown in FIG. 1A, now decreases to zero. By contrast, sub-caps 66, whose normal spacing 71 was originally shown in FIG. 1A, now is shown maximally spread apart as 71 in FIG. 3H. Said touching of sub-bases 54 acts as a built-in, maximum bending-stop for flexible razor head 50. This avoids the possibility that the user will damage said razor head by overbending. Blades 52 and 53 of FIG. 3H are shown as references. Referring again to FIG. 3H, one can easily visualize what would happen if the bending direction was maximally reversed In this event, sub-bases 54 would have their normal spacing 21 maximally spread apart, while sub-caps 66 would have their normal spacing 71 reduced to zero, when said sub-caps 66 touch each other at their highest points above blade 52. Said touching of sub-caps 66 acts as a built-in, maximum bending-stop for flexible razor head 50 in said visualized, reversed bending direction.

Another way of imposing maximum bending-stops on flexible razor head 50 is by choosing the length of end-slots 99, 15, 51 and 18 of top blade 52 in FIG. 4A. This will limit the back and forth movement of rivets 17 within said slots during deep-flexing of razor head 50. If desired, some of the other blade-slots of top blade 52 may also be employed in a similar manner to add further strength to these maximum bending-stops.

FIG. 3I shows a perspective view of a breakaway portion of flexible rib-anchor 79 originally shown best in FIG. 1A, but with said breakaway portion bent as far as possible in one direction. The edges of sub-housings 20 now touch each other and act as a bending-stop for flexible rib-anchor 79 in either bending direction. Webs 39 act as living-hinges during bending of rib-anchor 79. Spaces or gaps 80 either decrease to zero or spread maximally apart during maximum bending of rib-anchor 79 in either bending direction. These built-in bending-stops keep said flexible rib-anchor 79 from being damaged from overbending by the user.

As shown best in FIGS. 1A and 4A, the center-sub-cap 85 and sub-base 56, with its attached guard-bar, are part of the center blade-holder-housing. As shown best in FIG. 5B, rectangular hole 83, located in the bottom of sub-base 56, accepts the tip 84 of top, center-rib 61 for gluing.

The exploded view shown in FIG. 4A shows that top blade 52 has two, round, center holes 82 and 10 that are the same diameter as the corresponding holes in blades'-sub-spacer 101, bottom blade 53 and sub-base 56. The center blade-holder-housing consists of center-sub-cap 85, with its two rivets 17 plus top blade 52, blades'sub-spacer 101, bottom blade 53 and sub-base 56. This center blade-holder-housing is the only housing that is fixed and does not slide back and forth longitudinally with respect to top blade 52 during flexing of razor head 50, as is also shown in FIG. 5A. However, as shown best in FIG. 4A, all the other holes on either side of holes 82 and 10 in top blade 52 are actually slots of progressively longer lengths. End-slots 99, 15, 51 and 18 are the longest in order to allow rivets 17 to be able to fully slide back and forth within these end-slots during very deep-flexing of razor head 50. Living-hinge 57 is shown as part of end-sub-base 112, while living-hinge 57' is shown as part of end-sub-base 111 in said FIG. 4A, as discussed earlier for FIG. 1A.

FIG. 4B shows a cross-sectional view of end-sub-base 112 of base-member 91, originally designated in FIG. 4A. Said FIG. 4B view shows living-hinge 57, living-hinge side-wall 58, living-hinge top-wall 38 and cavity 103 that will accept the tip 107 of top, outer-rib section 75 for gluing, as shown best in FIG. 4A. Refer to FIGS. 1, 3, 4 and 5 for the following discussions, wherein these Figures all show different views of the same embodiment shown in FIG. 1A and will now be discussed in further detail:

FIG. 4A shows a plurality of individual, sub-caps 66 and 85 plus end-sub-caps 23 and 26 that make up cap-member 89, which is shown as it comes out of an injection mold as one piece. Hot, molten plastic 93 is forced into a mold, into a hollowed-out, rod-like path 86 and then into multiple, hollowed-out sub-paths 5 that feed the molten plastic into forming the entire cap-member 89.

In a similar manner, in FIG. 4A, blades 52 and 53 have blades'-sub-spacers 101 plus end-blades'-sub-spacers 92 and 100 that make up blades'-spacer member 90, which is shown as it comes out of an injection mold, as one piece. Hot, molten plastic 94 is forced into a mold, into hollowed-out, rod-like path 87 and then into multiple, hollowed-out sub-paths 6 that feed the molten plastic into forming the entire blades'-spacer member 90 in FIG. 4A.

Additionally, in a similar manner, as shown best in FIGS. 4A, 5A and 5B, each of the multiple, bottom sub-bases plus each of their multiple, attached guard-bars are combined as one piece, and each combination is labeled 54. However, the center-sub-base plus its attached guard-bar, combined as one unit, is labeled 56, while the two wider end-sub-bases, with their attached guard-bars 25 and 24, are separately labeled 112 and 111. Hot, molten plastic 95 is forced into a mold, into hollowed-out, rod-like path 88 and then into multiple, hollowed-out sub-paths 7 that feed the molten plastic into forming the entire base-member 91.

The assembled flexible-blade razor head 50 in FIG. 5A may now show how its components were assembled by referring to FIGS. 4A and 5A during the following discussion:

Top cap-member 89 in FIG. 4A is lowered down until rivet 17 passes through top blade 52, slot 18, then through end-blades'-sub-spacer 92, hole 19, then through bottom blade 53, hole 40 and finally through end-sub-base 112, hole 106, with its attached guard-bar 25.

In a similar manner and at the same time as above, all the remaining rivets 17 of cap-member 89 pass through top blade 52, blades'-spacer member 90, bottom blade 53 and base-member 91, including end-sub-base 111, with its attached guard-bar 24.

With the entire flexible-blade razor head 50 now physically assembled, rivets 17 may now have their heads ultrasonically flattened, where they extend past the bottom of the base-member 91 of FIG. 4A. In FIGS. 4A, 5A and 5B for example, the rivets 17, whose heads poke out of each pair of bottom holes of subbases 54, may now have their rivet-heads flattened ultrasonically. Similarly, the hidden pair of holes, located within the bottom portion of rectangular cavity 83, in center-sub-base 56, may now also have their associated rivet-heads flattened ultrasonically. Additionally, the pair of holes in end-sub-base 111 and the pair of holes in end-sub-base 112 may now also have their associated rivet-heads flattened ultrasonically.

The now completely assembled and fully riveted razor head 50 may, at this time, have superfluous material removed, as shown in FIG. 4A and as explained as follows:

(a) Injection-molded rod-path 86 may be removed by slicing through multiple, injection-molded sub-paths 5 with a sharp knife or cut-off laser, as designated by arrow 96.

(b) Injection-molded rod-path 87 may be removed by slicing through multiple, injection-molded sub-paths 6 with a sharp knife or cut-off laser, as designated by arrow 97.

(c) Injection-molded rod-path 88 may be removed by slicing through multiple, injection-molded sub-paths 7 with a sharp knife or cut-off laser, as designated by arrow 98.

As best shown in FIGS. 1A and 2, the three telescopic, bottom-rib sections 62, 64 and 63 plus the flexible, rib-anchor 79 may be considered for injection-molding as one piece.

FIG. 5A shows a perspective view of the same embodiment shown in FIG. 1A, showing a fully assembled, flexible razor head 50 with portions broken away to show the internal construction. Clearly shown is a perspective view of end-sub-base 112, showing living-hinge 57, living-hinge side-wall 58, cavity 103, living-hinge top-wall 38 and part of top, outer-rib section 75 with its tip 107.

As best shown in FIGS. 4A, 5A and 5B, the now fully completed razor head 50 may have said tip 107 of top, outer-rib section 75 glued into cavity 103 of end-sub-base 112. In a similar way, tip 108 of top, outer-rib section 76 may be glued into the cavity (not visible) located in the bottom of end-sub-base 111, as shown best in FIG. 4A. Additionally, tip 84 of the top of center-rib 61 may be glued into rectangular cavity 83, located in the bottom of sub-base 56, as best shown in FIGS. 5A and 5B.

We will now discuss a few additional details shown in FIGS. 1 through 5 as follows:

Razor head 50 has a plurality of sub-caps 66 that are spaced apart from each other by gaps 71 to facilitate easy and full bending of razor head 50, as shown best in FIGS. 1A, 4A and 5A.

Two holes 22 that are located in base-member 91, one hole in end-sub-base 111 and one hole in end-sub-base 112, are shown best in FIGS. 4A and 5A. These two holes 22 plus multiple gaps 21 that are located between multiple guard-bars 54, 56, 24 and 25 all serve to provide multiple paths for expended shaving cream and hair-shavings to exit razor head 50 during shaving.

End-sub-caps 23 and 26, of cap-member 89, shown best in FIG. 4A, have blades'-corner-guards 37 located on each outer end of said cap-member 89 to prevent the skin from touching the sharp corners of blades 52 and 53 during shaving.

DETAILED DESCRIPTION OF FIGS. 6A THROUGH 9

FIG. 6A shows a perspective view of another embodiment of this invention, showing a flexible razor, comprising: (a) a finger-grip-loop 74, which is connected via center-arm 77 to the bottom of center-sub-base 56 of flexible razor head 50, (b) handle outer-ribs 144 and 109 that carry said flexible razor head 50, (c) a handle rib-anchor 110 with two flexible, springy corner joints 143 and 142, that carry said handle outer-ribs 144 and 109.

Handle-body 144, 110 and 109 plus razor head 50 form a square or rectangular-shaped outline.

Handle outer-rib 144 connects to living-hinge 57, via living-hinge side-wall 58. This is similar to that described earlier for FIGS. 4A and 5A, regarding how top, outer-rib section 75 connects to living-hinge 57, via living-hinge side-wall 58.

Handle outer-rib 109 connects to a living-hinge on the other end of razor head 50, in a similar manner to that described for FIGS. 4A and 5A, regarding how top, outer-rib section 76 connects to a living-hinge on the other end of razor head 50.

Handle center-arm 77 connects to the bottom of center-sub-base 56 of razor head 50 in a similar manner to that described for FIGS. 5A and 5B regarding how top, center-rib section 61 connects to the bottom of center-sub-base 56 via rectangular cavity 83.

It is noted that center-arm 77 of FIG. 6A connects solely to the bottom of center-sub-base 56 of razor head 50 and not to handle rib-anchor 110, as was the case in the embodiment shown in FIG. 1A. Thus, center-arm 77 serves as a finger-manipulated arm with one end connected to flexible razor head 50.

The user may grasp the flexible razor shown in FIG. 6A from the rear so that handle rib-anchor 110 rests across the palm of the right hand, and the thumb may rest on the outside of handle outer-rib 109 so that said thumb points towards end-sub-cap 23 of razor head 50. The little finger may rest on the outside of handle outer-rib 144. The remaining three central fingers may fit through finger-grip-loop 74. Alternatively, some people may prefer one or two fingers through loop 74 and the remaining fingers on the outside of handle outer-rib 144.

The user may pull loop 74 of FIG. 6A towards handle rib-anchor 110, as shown by bottom arrow 128. This would make razor head 50 bend downwards, as shown by dashed line 127. Conversely, if the user pushes loop 74 towards razor head 50, as shown by top arrow 128, this would make the razor head bend upwards, as shown by dashed line 126. The tops of handle outer-ribs 109 and 144 will tilt modestly toward each other via the bending of flexible, corner joints 142 and 143 during deep razor bending. It is noted that very deep bending of flexible razor head 50 is easily attainable with this concept by simply choosing longer dimensions for the handle outer-ribs 144 and 109.

FIGS. 6A through 6F show different angles that may be built into the flexible razors shown in FIGS. 6A and 6D during manufacture, based on prior, flexible razor model-testing by the manufacturer with various people to see which angles most people like best.

FIG. 6B shows a cross-sectional view through the central portion of flexible razor head 50 and handle-body 144, 110, and 109, originally designated in FIG. 6A. FIGS. 6A and 6B show the back and forth movement path of flexing motion 128 of razor head 50. This back and forth movement path 128 of razor head 50 and center-arm 77 in FIGS. 6A and 6B always stays within the plane of said handle-body. Additionally, razor head 50 always remains perpendicular to center-arm 77 in the embodiment shown in FIGS. 6A and 6B.

FIG. 6C is similar to FIG. 6B except angle 2 shows the ability of the manufacturer to choose a different angle of razor head 50 versus the center-arm 77' that model-testing shows may please the most people. As shown in FIG. 6C, razor head 50 moves in a path 12 that is askew to the plane of the handle-body during razor flexing, wherein the flexing path 12 is always perpendicular to the plane of the blades. In regards to functionality, it is noted that 74', 77', 109' and 110' in FIG. 6C are analogous to the description for 74, 77, 109, 110 and 144 in said FIGS. 6A and 6B.

FIG. 6D shows another embodiment of this invention, which is a variation of the embodiment shown in FIG. 6A, wherein center-arm 78 is shown at an angle to the plane of the handle-body 131, 116 and 132. In said FIG. 6D, when the user pushes and pulls finger-grip-loop 105, as shown by arrows 117, it causes flexible razor head 50 to flex as shown by dashed lines 135 and 136. In this embodiment, handle outer-ribs 131 and 132 are much thicker and stiffer than handle rib-anchor 116, which is thin and flexible. Thin, flexible corner-joints 141 and 140 connect said rib-anchor 116 to said handle outer-ribs 131 and 132. Said flexing of razor head 50 causes the tops of handle outer-ribs 131 and 132 to tilt towards each other, which causes the center of handle rib-anchor 116 to bend downwards, as shown by dashed line 193 in FIG. 6D.

FIG. 6E shows a cross-sectional view through the central portion of flexible razor head 50 and the handle-body, as designated in FIG. 6D. Said FIG. 6E shows the path of razor head's 50 flexing motion 117 and additionally, shows the manufacturer's ability to choose a different angle 8 of razor head 50 versus center-arm 78 at the time of manufacture. Also, FIGS. 6E and 6D show the ability of the manufacturer to choose a different angle 129 of center-arm 78 versus the plane of the handle-body 131, 116 and 132. In FIG. 6E, finger-loop 105 and arrows 117 function similarly to that described earlier for FIG. 6D.

FIG. 6F is similar to FIG. 6E, except the angle of flexible razor head 50 has been set at 90° relative to the plane of the handle-body so that the razor head 50 now flexes within the plane of the handle-body, as shown by arrows 3. Also, in FIG. 6F, arm 78' and its finger-grip-loop 105' are set at an angle 129' with respect to handle-body 116' and 132', analogous to that described for 78, 105, 129, 116, 132 and 131 in FIGS. 6D and 6E.

It is important to again note that these various choices of angles, as set forth in FIGS. 6A through 6F, can best be made after extensive test-sampling by many people with various working models.

Figure 7A:
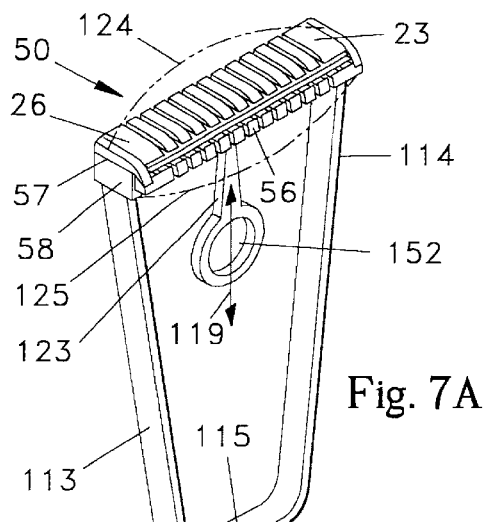
FIG. 7A shows a perspective view of another embodiment of this invention, similar to the embodiment shown in FIG. 6A, but with a trapezoidal-shaped handle-body instead of a square or rectangular-shaped handle-body.

FIG. 7A shows a perspective view of another embodiment of this invention, similar to the embodiment shown in FIG. 6A, but with a trapezoidal-shaped handle-body instead of a square or rectangular-shaped handle-body. The finger-grip-loop 152 is attached to center-arm 123, which is connected to the bottom of center-sub-base 56, which is part of flexible razor head 50. The connection of handle-body 113, 115 and 114 to flexible razor head 50 is similar to that described for FIG. 6A. The amount and direction of deflections of razor head 50, in response to the user's back and forth finger movement of finger-loop 152, is shown by dashed lines 124 and 125 and by arrows 119 in FIG. 7A. Handle-body 113, 115 and 114 responds to the deflections 124 and 125 of razor head 50 by modestly bending mostly in the long, springy outer-ribs 113 and 114, since there are no flexible, springy, corner joints as shown in FIG. 6A as 142 and 143.

Figure 7B:
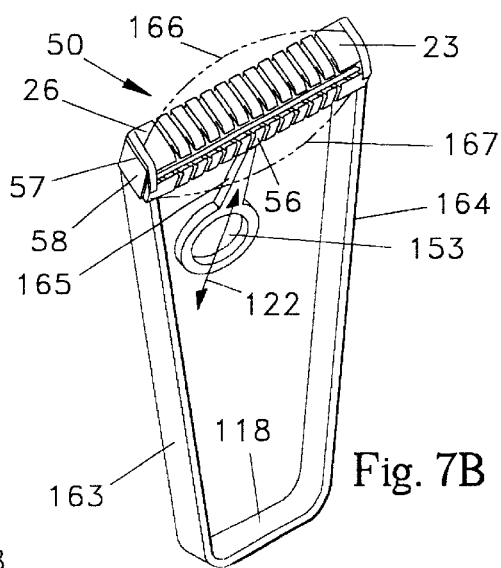
FIG. 7B shows a perspective view of a variation of FIG. 7A, showing a new angular position of the center-rib. This is similar to that described for FIG. 6D, but with a trapezoidal-shaped handle-body instead of a square or rectangular-shaped handle-body.

FIG. 7B shows a variation of the embodiment shown in FIG. 7A, whereby center-arm 165 is shown at an angle to the plane of handle-body 163, 118 and 164. This embodiment is similar to that described for FIG. 6D, but with a trapezoidal-shaped handle-body instead of a square or rectangular-shaped handle-body. The amount and directions of deflections of razor head 50, in response to the user's back and forth finger movement of finger-grip-loop 153, is shown by dashed lines 166 and 167 and by arrows 122, which also show the flexing path.

Figure 7C:
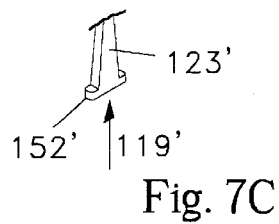
FIG. 7C shows a perspective view of a markedly modified, breakaway portion of the center-arm shown in FIG. 7A.

FIG. 7C shows a perspective view of a markedly modified breakaway portion of center-arm 123 and finger-loop 152 of FIG. 7A, which are now labeled 123' and 152' in said FIG. 7C. If a user was to shave with said modified version of the flexible razor of FIG. 7A, wherein center-arm 123 was deleted and rod-like center-arm 123' of FIG. 7C was substituted and inserted into said FIG. 7A, said user would be able to do the following:

(a) Said user would be able to shave a concave surface by grasping handle-body 113, 115 and 114 of said modified FIG. 7A and then pushing on the bottom 152' of rod-like center-arm 123' with a force shown by arrow 119', preferably with the index finger. This action would force flexible razor head 50 to bend outwards, as shown by dashed line 124 of FIG. 7A, in order to shave said concave surface.

(b) Said user would be able to shave a flat surface by repeating the grasping procedure discussed in paragraph (a) above, and additionally, by carefully adjusting the amount of said index-finger force 119' applied to the bottom 152' of said rod-like center-arm 123', so as to hold said razor head 50 in an unbent, straight position for shaving said flat surface.

(c) Said user would be able to shave a convex surface by grasping said handle-body 113, 115 and 114 and then gently pushing razor head 50 against said convex surface. This action forces said razor head 50 of FIG. 7A to bend downwards, as shown by dashed line 125. Additionally, the user may further assist said bending or razor head 50 by finger-pushing or finger-squeezing outer-ribs 113 and 114 towards each other during shaving of said convex surface. This squeezing procedure is similar to that described earlier for FIG. 1A, regarding the finger-squeezing of outer-ribs 75/62 and 76/63 towards each other, as shown by arrows 41, 42, 43 on the left and 44, 45, 46 on the right in said FIG. 1A.

Figure 7D:
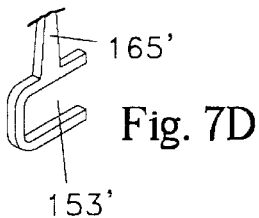
FIG. 7D shows a perspective view of a markedly modified, breakaway portion of the center-arm and finger-grip-loop shown in FIG. 7B.

FIG. 7D shows a perspective view of a markedly modified breakaway portion of finger-grip-loop 153 that is shown in FIG. 7B, using a new C-shaped finger-grip configuration, which is labeled 153' in said FIG. 7D. Center-arm 165' in FIG. 7D replaces center-arm 165 in FIG. 7B. Said new C-shaped configuration 153', as now installed into FIG. 7B, would allow a user to slip one or two fingers into said finger-grip configuration from the side for greater comfort and easier access.

It is noted that the descriptions and procedures discussed above for FIGS. 7C and 7D may also be employed in FIGS. 6A, 6D, 7A and 7B. Referring to the flexible razors shown in FIGS. 7A, 7B, 6A and 6D, the user may shave a flat shaving surface with any one of said flexible razors by finger-manipulating the finger-grip-loop until the flexible razor head 50 is straight and unbent in order to closely match the shape of said flat surface during shaving. Additionally, in a similar manner, the user may shave a convex or a concave shaving surface by finger-manipulating said finger-grip-loop in order to bend said flexible razor head 50 so as to closely match the shape of said convex or concave surface during shaving.

Figure 8:
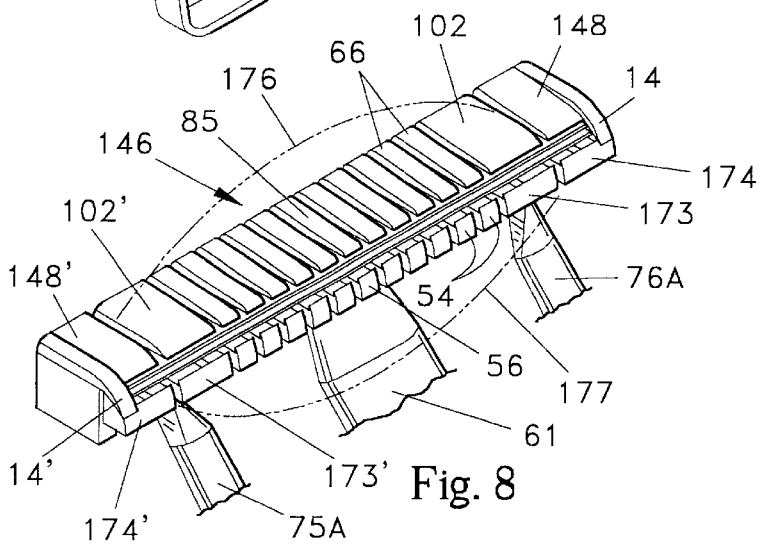
FIG. 8 shows a perspective view of another embodiment of this invention, showing a flexible razor head, with each outer-rib connected a fixed distance in from each outer end of said flexible razor head, in contrast to FIG. 1A, which shows each outer-rib connected directly to each outer end of the flexible razor head.

FIG. 8 shows a perspective view of another embodiment of this invention, showing a flexible razor head 146, with each one of top outer-ribs 75A and 76A connected a fixed distance in from each outer end of said razor head. In contrast, top outer-ribs 75 and 76, shown best in FIGS. 1A and 3E, are connected to the extreme outer ends of razor head 50. Thus, the handle shown in FIG. 8 can be narrower in width than the handle in FIG. 1A, even though both razor heads may be the same length. When the flexible razor head 146 of FIG. 8 is flexed, its deflection path is shown by dashed lines 176 and 177. The left and right overhanging end-sections of FIG. 8, whose end-sub-caps are 148' and 148, are complementary and symmetrical to each other. Right-end-section of razor head 146, whose end-sub-cap is 148, has a guard-bar 174 and a blades'-corner-guard 14. Left-end-section of razor head 146, whose end-sub-cap is 148', has a guard-bar 174' and a blades'-corner-guard 14'. The rest of the razor head 146 of FIG. 8, between sub-caps 102 and 102', is similar to razor head 50 between end-sub-caps 26 and 23 of FIG. 1A, as described earlier. Additionally, guard-bars 173 and 173' of FIG. 8 are similar to end-guard-bars 24 and 25 of FIG. 1A.

Figure 9:
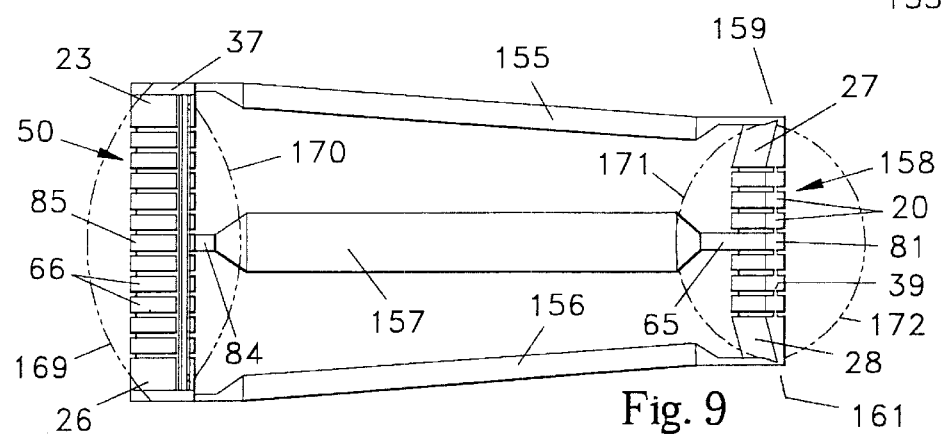
FIG. 9 shows an elevational view of another embodiment of this invention, showing a flexible razor, similar to FIG. 3E, but with a trapezoidal-shaped handle-body instead of a rectangular-shaped handle-body.

FIG. 9 shows an elevational view of another embodiment of this invention, showing a flexible razor similar to FIG. 1A, but with a trapezoidal-shaped handle-body instead of a rectangular-shaped handle-body. Because flexible razor head 50 shown in FIG. 9 is longer than flexible rib-anchor 158, the amplitudes of deflection, shown by dashed lines 169 and 170 of said razor head 50, are less in peak-excursions than the amplitudes of deflection of dashed lines 171 and 172 of the flexible rib-anchor 158. For simplicity, in FIG. 9, outer-ribs 155 and 156, as well as center-rib 157, are all shown without telescopic ribs, while FIG. 1A does show telescopic ribs. However, in a similar manner to the telescopic ribs shown in FIG. 1A, the embodiment shown in FIG. 9 may, indeed, also use telescopic ribs, if desired. In FIG. 9, living-hinges 159 and 161 are shown connecting the two outer-ribs 155 and 156 to end-housings 27 and 28 of flexible rib-anchor 158. The other ends of said ribs 155 and 156 are connected to flexible razor head 50 via living-hinges in a similar manner to the way top outer-ribs 75 and 76 are connected to flexible razor head 50 via living-hinges, as described for FIGS. 1A and 5A. Flexible rib-anchor 158 of FIG. 9 is shorter in length, but otherwise, very similar to flexible rib-anchor 79 of FIG. 1, described earlier. Tip 65 of center-rib 157 of FIG. 9 is very similar to tip 65 of center-rib 61/64 of FIG. 1A, described earlier. Each of said tips 65 is glued to a separate center sub-housing 81 of a row of sub-housings 20 of each of said flexible rib-anchors 158 and 79.

The user may shave concave or convex surfaces with the flexible razor shown in FIG. 9 by simply using the fingers to push center-rib 157 either above or below the plane of outer-ribs 155 and 156, in either bending direction. For shaving flat body surfaces, the user may simply use the fingers to hold center-rib 157 in the same plane as outer-ribs 155 and 156, so that razor head 50 is straight and unbent. This entire shaving procedure for said FIG. 9 is similar to that described earlier for FIG. 1A that specifically ignores said finger-grip hole 70 in said FIG. 1A.

DETAILED DESCRIPTION OF FIGS. 10A THROUGH 17B

Refer to said U.S. Pat. No. 4,720,917 (1988) to Solow regarding the following, as set forth in this paragraph: FIGS. 2, 3, 5, 6 and 8 of said 1988 patent are the first to show the use of bendable, plastic hinges (or webs) 29, which are nonslidable and are located between guard-bar tips 23. Said plastic hinges 29 keep the skin from flowing between said guard-bar tips 23 and being pinched or distorted during shaving.

Figure 10A:
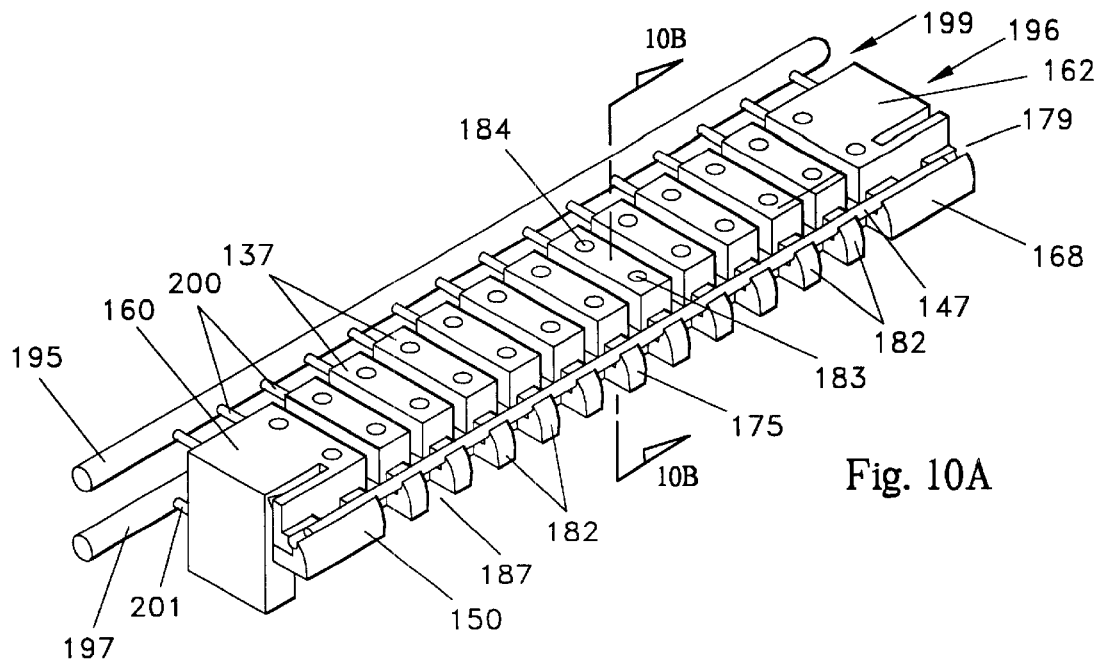
FIG. 10A shows a perspective view of a new, flexible razor base-member, containing a long, round, flexible, slidable, rod-like guard-bar-web, in contrast to the original base-member, which contained no guard-bar-web, as shown best in FIGS. 4A and 5A.

FIG. 10A of the present invention shows a perspective view of a new base-member 196, which is a modification of old base-member 91, originally shown in FIG. 4A. Old base-member 91 has been modified by the addition of a long, round, flexible, slidable, rod-like guard-bar-web 147, slidably-mounted in the tips of a row of multiple guard-bars 182 and 175 plus end-guard-bars 150 and 168, as shown in said FIG. 10A. This results in the formation of one long, flexible, slidable, rod-like guard-bar-web 147, with a circular cross-section rather than the row of multiple, individual guard-bars 182, 175, 150 and 168, with multiple gaps 187. Said long, flexible, guard-bar-web 147 provides a smooth, uniform shave by not allowing any skin to flow between said multiple guard-bars into said multiple gaps 187 during shaving. Said web 147, which is slidably-mounted in the tips of said guard-bars in order to form one long, slidable guard-bar-web 147, greatly reduces the amount of transverse sliding required by the slotted blade 52 of FIG. 12A during flexing of razor head 151. Thus, this makes it easier to bend said razor head 151 of FIG. 12A because there is less friction when compared to Prior Art that employed nonslidable, plastic hinges, mounted in the tips of the multiple guard-bars, as described earlier regarding said 1988 U.S. Pat. No. 4,720,917. Additionally, it is important to note that the curvature-shape of web 147 during bending of razor head 151 of FIG. 12A more accurately matches the curvature-shape of blades 52 and 53 than the use of Prior Art's nonslidable hinges under the same operating conditions. The reason for this is because said blades 52 and 53 bend smoothly and uniformly since they have no hinges. However, the use of said Prior Art's nonslidable hinges between the tips of the guard-bars causes nonuniform spacing between the blades and the guard-bar tips during bending of the razor head. Thus, the smooth, uniform and superior bending accuracy of said web 147, shown in FIG. 12A, results in a closer, very uniform shave in comparison to said Prior Art's use of nonslidable hinges.

Figure 10B:
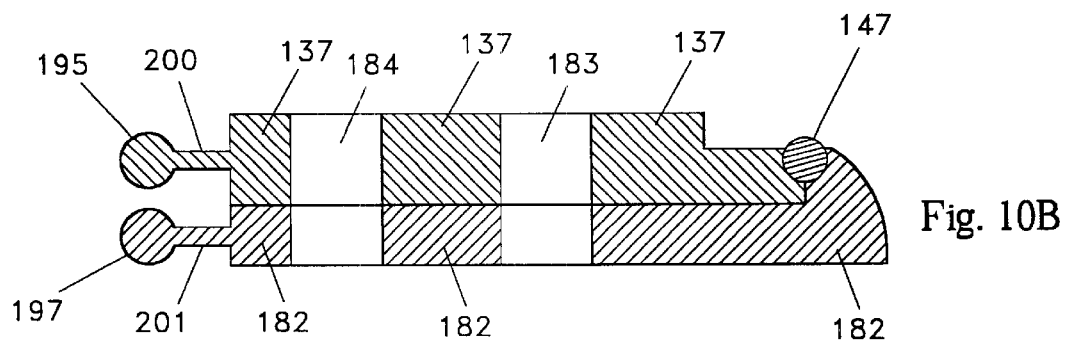
FIG. 10B shows a cross-sectional view of one of a plurality of sub-bases, each with its own attached guard-bar. These guard-bars carry a long, round, flexible, slidable, rod-like guard-bar-web.

FIG. 10B shows a cross-sectional view of a top-sub-base 137 and a bottom-sub-base plus its attached guard-bar in a combination labeled 182 plus rivet holes 183 and 184. FIG. 10B was designated in FIG. 10A Each combination of a top-sub-base and a bottom-sub-base is called a sub-base of base-member 196.

Figure 12A:
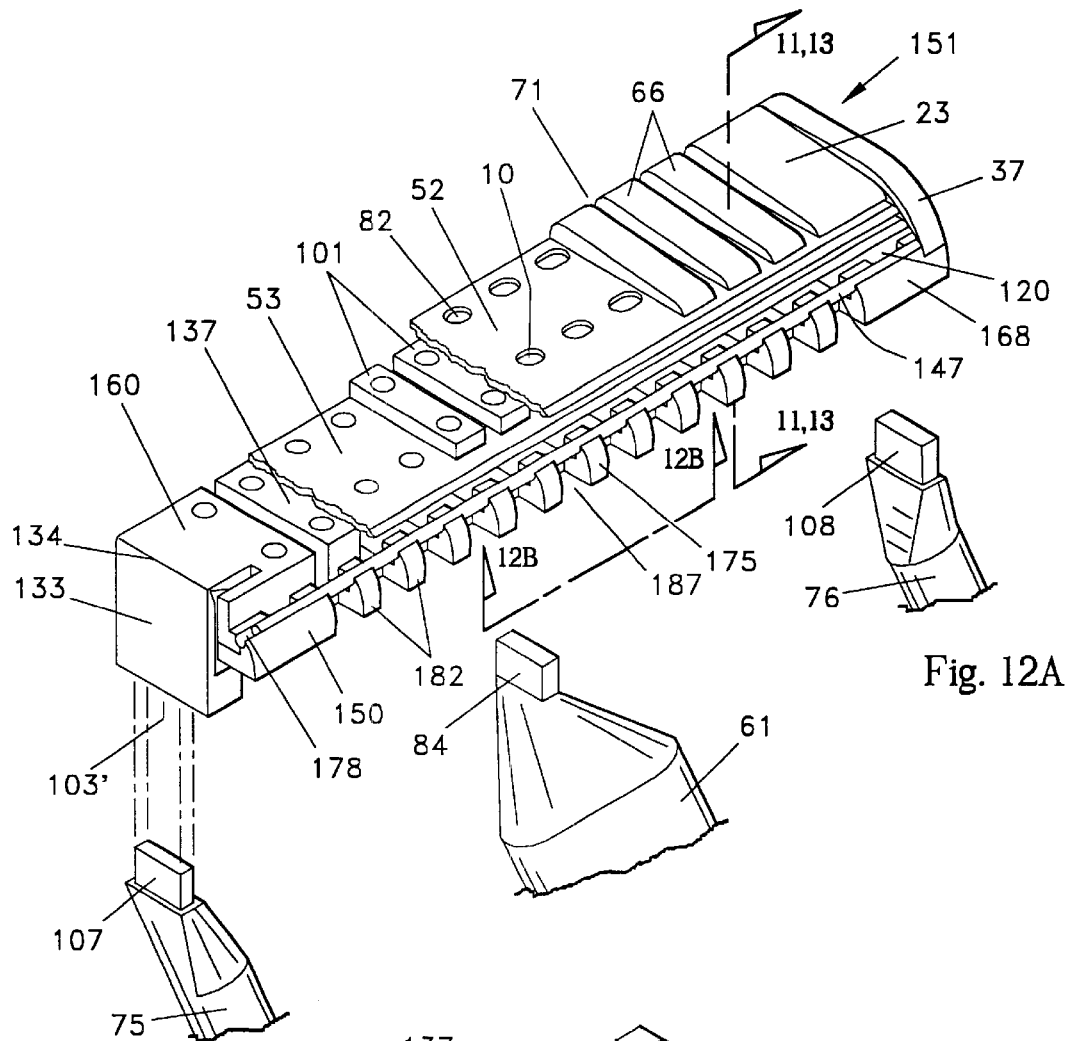
FIG. 12A shows a perspective view of a partially broken-away, fully assembled, flexible razor head that is a modification of FIG. 5A, wherein the entire base-member shown in FIG. 5A is deleted and the entire new base-member shown in FIG. 10A is substituted and inserted into said FIG. 12A.

Referring to FIGS. 10A, 10B and 12A, one can see how new base-member 196 was formed. A group of top-sub-bases 137 is separately formed when hot, molten plastic is forced into a mold, then into a hollowed-out, rod-like path 195 and multiple sub-paths 200, which feed the molten plastic into forming the entire group of top-sub-bases 137 plus the tops of end-sub-bases 160 and 162. The tops of said end-sub-bases 160 and 162 include living-hinges 134 and living-hinge side-walls 133 that are shown in FIGS. 12A and 10A and are numerically marked in FIG. 12A. A group of bottom-sub-bases with attached guard-bars 182 is separately formed when hot, molten plastic is forced into a mold into a hollowed-out, rod-like path 197 and multiple sub-paths 201. These paths feed the molten plastic into forming the entire group of bottom-sub-bases with attached guard-bars 182 and 175, including the bottoms of end-sub-bases 160 and 162 plus their attached end-guard-bars 150 and 168. As shown in FIGS. 10B and 10A, said two groups of top-sub-bases 137 and bottom-sub-bases plus their attached guard-bars, in a combination labeled 182 or 175, are then ultrasonically bonded together to form a group of sub-bases that are part of base-member 196. Thus, base-member 196 is comprised of said group of sub-bases plus end-sub-bases 160 and 162 plus round, rod-like web 147, which may be slid into place via opening 179, as shown in FIG. 10A.

New razor head 151 of FIG. 12A is shown assembled, with some parts broken away to show the internal construction. This is similar to that originally described for FIGS. 4A and 5A, but with new base-member 196 of FIG. 10A now substituted for old base-member 91 of FIGS. 4A and 5A and inserted into said FIG. 12A. Lastly, superfluous, injection-molded material is sliced away, as shown by arrow 199 of FIG. 10A, wherein a knife or a laser cuts through multiple sub-paths 200 and 201 in order to discard rod-like, plastic paths 195 and 197.

Figure 11:
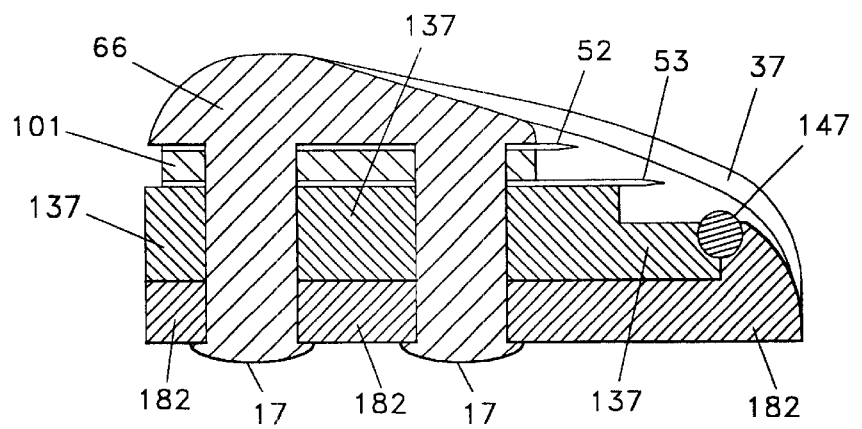
FIG. 11 shows a cross-sectional view of one of a plurality of blade-holder housings and an associated, long, round, flexible, slidable, rod-like guard-bar-web, as designated in FIG. 12A.

As originally designated in FIG. 12A, FIG. 11 shows a cross-sectional view of one blade-holder-housing of the new, assembled, flexible razor bead 151, with a longitudinally-slidable, round, rod-like flexible web 147, sub-cap 66, blades 52 and 53, blades'-sub-spacer 101, top-sub-base 137, bottom-sub-base and attached guard-bar combination 182, rivets 17 and blades'-corner-guard 37.

As discussed above, another embodiment of this invention is shown in FIG. 12A, which shows a perspective, partially broken-away view of a new, modified, fully assembled flexible razor head 151 that now has said new base-member 196 that was originally shown in FIG. 10A. FIG. 12A also shows narrow guard-bar tips 182 and 175, which carry a long, round, flexible, slidable, rod-like guard-bar-web 147. Said web 147 is slidably mounted in the tips of multiple guard-bars 182 and 175 plus end-guard-bars 168 and 150, as described previously for FIG. 10A. Said web 147 keeps the skin from flowing between said multiple guard-bars 182, 175, 168, and 150 into multiple gaps 187 between said guard-bars during shaving, as shown best in FIG. 12A. Said web 147 yields a smooth, even shave, while without said web, the skin would flow into said gaps 187, yielding an uneven shave.

It is noted that end-sub-base 112, living-hinge 57 and living-hinge side-wall 58, of FIG. 5A are similar to end-sub-base 160, living-hinge 134 and living-hinge side-wall 133 of FIG. 12A. Also shown in FIG. 12A is cavity 103' that accepts tip 107 of top, outer-rib section 75 for gluing. Similarly, tip 108 of top, outer-rib section 76 may be glued into an analogous, living-hinge assembly, which is not visible in FIG. 12A. Additionally, it is shown in FIGS. 12A and 10A that short gaps 178, located at each end of rod-like web 147, leave room for expansion movement of said web during deep-flexing of razor head 151.

In FIGS. 1A, 2, 4A and 5A, multiple gaps 21 plus left and right holes 22 serve to provide multiple paths for expended shaving cream and hair shavings to exit flexible razor head 50 during shaving, while in an analogous manner, in FIG. 12A, multiple gaps 187 plus left and right holes 120 serve to do the same thing for flexible razor head 151.

Figure 12B:
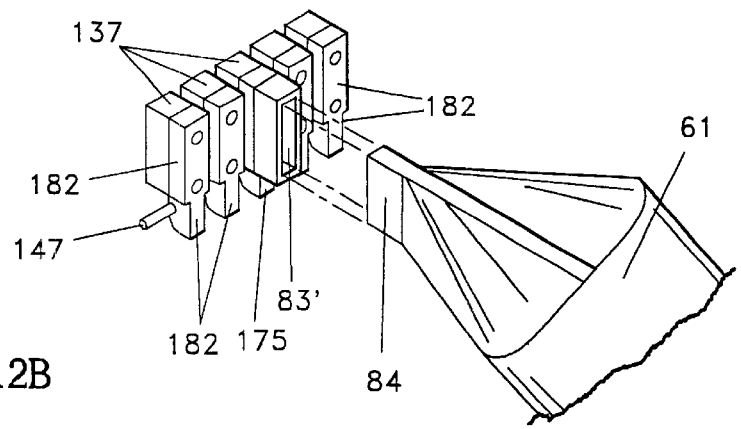
FIG. 12B, as designated in FIG. 12A, shows a bottom view of a center portion of the assembled flexible razor head shown in said FIG. 12A. It is noted that said

FIG. 12B shows a bottom, perspective view of a center portion of the assembled, new, flexible razor head 151, which is similar to that described for FIG. 5B. FIG. 12B was originally designated in FIG. 12A and shows narrow guard-bar tips 182 and 175, in contrast to the wide guard-bar tips 54 and 56 shown in FIG. 5B. FIG. 12B also shows that top, center-rib section 61 has a tip 84, which may be glued into the bottom of center-sub-base 175 via rectangular cavity 83'. Additionally, long, round, flexible, rod-like guard-bar-web 147 is shown slidably mounted in the tips of guard-bars 182 and 175 in said FIG. 12B.

Figure 13:
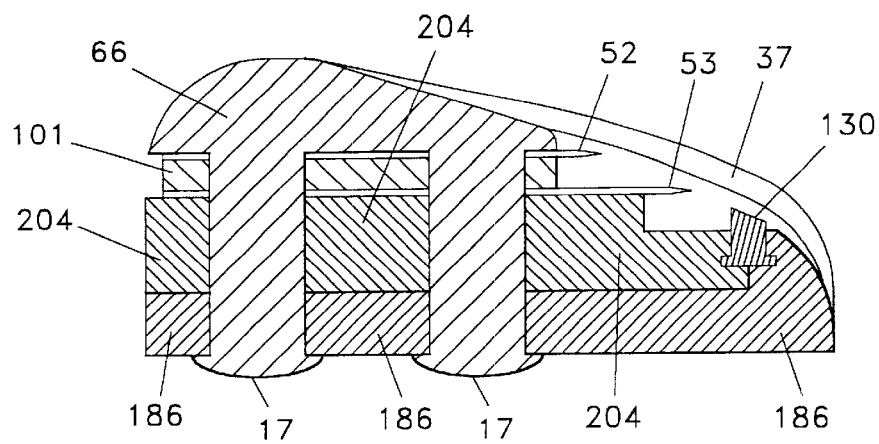
FIG. 13 shows a cross-sectional view of one of a plurality of blade-holder housings, which is very similar to FIG. 11 except for the substitution of a specially shaped, long, flexible, slidable, rod-like guard-bar-web in place of the round guard-bar-web shown in FIG. 11.

FIG. 13 shows a cross-sectional view of one of a plurality of blade-holder housings, which is virtually identical to FIG. 11, except for the substitution of a specially shaped, long, rod-like, flexible, slidable guard-bar-web 130 in place of the round guard-bar-web 147, shown in FIG. 11. FIG. 13 was originally designated in FIG. 12A. Regarding expended shavings flow, said specially shaped guard-bar-web 130 allows a slightly closer spacing between the cutting edge of blade 53 and the pointed edge of web 130 versus the round-shaped web 147 in FIG. 11. FIG. 13 also shows how top-sub-base 204 and bottom-sub-base 186 hold said specially shaped guard-bar-web 130 slidably in position in the tip of the guard-bar.

Figure 14A:
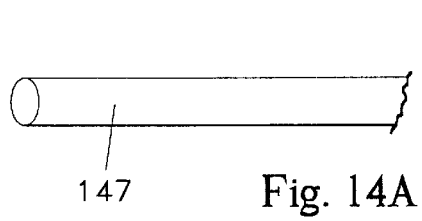
FIG. 14A shows a perspective view of a portion of a long web, which acts as a long, round, flexible, slidable, rod-like guard-bar-web, as also shown in FIGS. 10A, 10B, 11, 12A, 12B, 16A, 16B, 17A and 17B.

FIG. 14A shows a perspective view of a portion of a long, round, flexible, slidable, rod-like guard-bar-web 147, which can be slidably mounted in the tips of guard-bars 182, 175, 150 and 168 by inserting it through end-opening 179 of new base-member 196, as shown best in FIG. 10A. Alternatively, web 147 can be dropped into place just before the bottom-sub-bases with attached guard-bars 182 are bonded to the top-sub-bases 137, as shown best in FIG. 10B. It is noted that guard-bar-web 147 is also shown in FIGS. 10A, 10B, 11, 12A, 12B, 16A, 16B, 17A and 17B and is discussed in the text regarding said Figures.

Figure 14B:
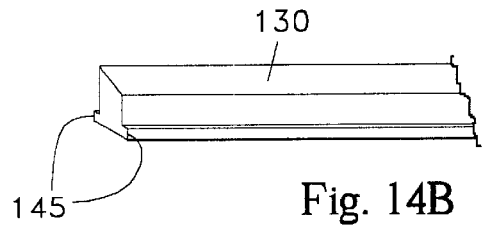
FIG. 14B shows a perspective view of a portion of a specially shaped, long, flexible, slidable, rod-like guard-bar-web, as originally shown in FIG. 13.

FIG. 14B shows a perspective view of a portion of a specially shaped, long, rod-like, flexible, slidable guard-bar-web 130, with flanges 145 to hold it slidably in position, as shown in FIG. 13. Web 130 was also previously discussed above, regarding FIG. 13.

Figure 14C:
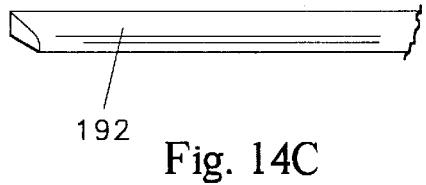
FIG. 14C shows a perspective view of a portion of a long, thin, rubbery, rod-like caps'-guard-web of special shape that is held in position on or near the top blade of the flexible razor head shown in FIGS. 16A and 16B.

FIG. 14C shows a perspective view of a portion of a specially shaped, long, thin, rubbery, rod-like caps'-guard-web 192 that is also shown in FIGS. 16A and 16B. Said web 192 acts as a continuous, long, flexible, caps'-guard-web, which smooths out only the forward edges of multiple gaps 121 between multiple sub-caps 188 and 181 in FIG. 16A during shaving. Discussions for FIGS. 16A and 16B below will provide more information on caps'-guard-web 192.

Figure 14D:
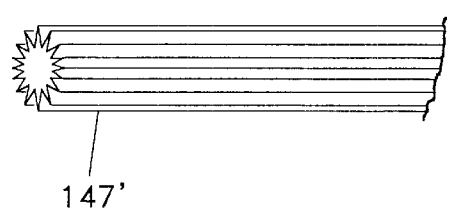
FIG. 14D shows a perspective view of a portion of a long, round, flexible, slidable, rod-like guard-bar-web with multiple, long, narrow serrations. This is a modification of FIG. 14A, which has no serrations.

FIG. 14D shows serrated web 147' that is a modification of the long, round, flexible, slidable, rod-like web 147 of FIG. 14A, which now, in FIG. 14D, contains long, narrow, multiple serrations. However, serrated web 147' is still longitudinally slidable, when installed in the guard-bar tips, just like web 147 in FIGS. 14A, 12A and 10A. Said multiple serrations are preferably parallel to the central axis of said web 147'. Said serrations of web 147' help to pre-bend the beard stubble to enable closer cut-off during shaving. Said web 147' may be kept from possible unwanted rotation when contacting said stubble by putting a mating tooth in one or more of said guard-bar 182 tips of FIGS. 10A, 12A, 16A or 17A (said mating tooth is not shown), wherein said mating tooth slidably fits into one of the crevices between said multiple serrations of said web 147'. In this event, web 147' would still be free to slide longitudinally during razor flexing, like web 147, described previously for FIGS. 10A and 12A. Alternatively, the cross-section of serrated web 147' may be oval, square, trapezoidal etc.

Figure 15:
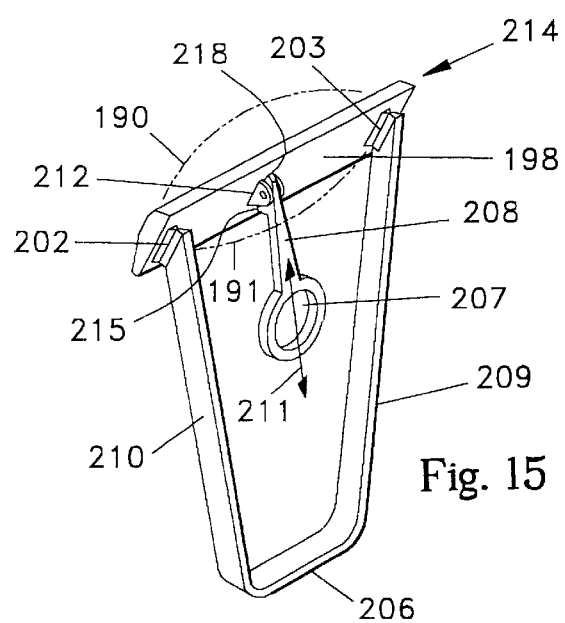
FIG. 15 shows a perspective view of another flexible razor embodiment of this invention, showing a hinged center-arm. This is in contrast to FIGS. 7A and 7B, which are similar to FIG. 15 but have no hinged center-arm.

FIG. 15 shows a perspective view of another embodiment of this invention that is similar to FIGS. 7A and 7B that were discussed earlier. However, wherein FIG. 15 has a hinge 212 between center-arm 208 and flexible razor head 214, neither of FIG. 7A or 7B has a hinge. Flexible razor head 214 is connected to a trapezoidal-shaped handle 210, 206 and 209 via living-hinges 202 and 203. The user may grasp the trapezoidal handle and put a finger into finger-grip-loop 207. When the user pushes finger-grip-loop 207 towards or away from razor head 214, as shown by arrows 211, said razor head flexes, as shown by dashed lines 190 and 191. Finger grip-loop 207 is connected to the back 198 of razor head 214 via center-rib-arm 208 and hinge 212. Each user is free to select different angles for rib-arm 208 via finger-grip loop 207 and hinge 212, which may be personally more comfortable during shaving. Hinge-stops 215 and 218 make sure that finger-grip-loop 207 does not flop away too far to comfortably reach, but always remains nearby for the user's finger to grip.

Another embodiment of this invention is shown in FIG. 16A, which shows a perspective view of part of a new razor head 222 that is an improvement of the razor head 151 shown in FIG. 12A. FIG. 12A shows multiple sub-caps 66 and 23 that are separated by multiple gaps 71. This allows some skin to flow into said gaps 71 during shaving, which results in an uneven shave. FIG. 16A solves this problem by providing a specially shaped, rubbery caps'-guard-web 192, as originally shown in FIG. 14C. This was discussed earlier as caps'-guard-web 192, regarding said FIG. 14C. This rubbery caps'-guard-web 192 is preferably glued to the top blade 52 near and parallel to said blade's sharpened edge, as shown in FIGS. 16A and 16B. Said rubbery web 192 keeps the skin from flowing into the forward parts of multiple gaps 121, between multiple sub-caps 188 and 181 during shaving. Alternatively, the rear of said rubbery web 192 may be glued only to the multiple, front tips of sub-caps 188 and 181, while the bottom of web 192 rests on or near top blade 52.

FIG. 16B shows a cross-sectional view of a blade-holder-housing as designated in FIG. 16A. This view clearly shows the position of said rubbery, caps'-guard-web 192, which is shown mounted on the top blade 52, near and parallel to its sharpened edge. Sub-cap 188 and attached rivets 17 show how said blade-holder-housing is held together by said rivets 17 in said FIG. 16B. Blades 52 and 53 are held a fixed distance apart by blades'-sub-spacer 101. Top-sub-base 137 and bottom-sub-base and attached guard-bar combination 182 are ultrasonically welded together and thereby hold round, rod-like web 147 slidably in place, as explained earlier for FIGS. 10A, 10B, 11 and 12A. Blades'-corner-guard 180, shown in FIGS. 16A and 16B, protects the skin from touching the sharp corners of blades 52 and 53.

FIG. 17A shows a perspective view of another embodiment of this invention, showing part of another razor head 223 that is a modification of FIG. 16A and shows the addition of multiple, lubrication strips 221 and 219. Multiple sub-caps 205 and 220 have said multiple, lubrication strips 221 and 219 glued on and are separated from each other by gaps 139. Additionally, long, rubbery caps'-guard-web 192 of FIG. 16A has been deleted and replaced with a plurality of tiny, rubbery sub-caps'-pads 194, as shown in FIG. 17A. These tiny, rubbery sub-caps'-pads 194, which may be glued or injection-molded into place, compress and expand when blade 52 flexes. The end result is a uniform, smooth, non-serrated front edge of the entire cap-member that keeps the skin from flowing into the front parts of said plurality of gaps 139 during shaving. Blades'-corner-guard 185, shown in FIGS. 17A and 17B, protects the skin from the sharp corners of blades 52 and 53.

FIG. 17B shows an off-center, sectional, side view of one of a plurality of blade-holder-housings, as designated in FIG. 17A. Side views of one sub-cap 205 with its attached lubrication strip 221, blades'-sub-spacer 101, top-sub-base 137 and bottom-sub-base and attached guard-bar combination 182, as well as blades 52 and 53, are all clearly visible. Additionally shown are cross-sectional views of one of the tiny, rubbery sub-caps'-pads 194 and of the long, round, flexible, rod-like, slidable guard-bar-web 147. Said guard-bar-web 147 was described best earlier for FIGS. 10A, 10B, 11, 12A and 12B.

SUMMARY NOTED-ITEMS, RAMIFICATIONS AND SCOPE OF THE INVENTION

The present invention is directed to various flexible blade razors whose flexing and bending are assisted by the user's fingers. These novel, flexible-blade razors are able to bend as deeply as required in order to conform to and closely shave convex, concave or flat surfaces of the body, in a single, full-width, shaving stroke.

It is important to note that for all purposes and usage throughout this patent, the words or phraseology relating to "finger-assisted" razor-bending is hereby defined to mean "finger-manipulated" razor-bending by the user.

Additionally, it is noted that the three, basic components of a flexible razor head, as used in Prior Art patents, were called: (1) a cap (2) a blade (3) a seat or blade seat or a base. However, in this present patent, said same three, basic components of a flexible razor head are hereby called: (1) a cap or cap-member (2) a blade (3) a base or base-member.

The user's fingers may be used to control the amount and direction of razor-bending during shaving. The inherent novel features of this invention enable deep, easy, finger-assisted razor-bending on flat or steeply contoured convex or concave body surfaces that are dramatic improvements over any Prior Art flexible razor.

For example, a problem in Prior Art was that the maximum amount of finger-assisted razor-bending was limited to the maximum amount of unbending of permanently curved flexible ribs, as was discussed earlier under Background-Description of Prior Art, paragraph (a). However, in the present invention, the ribs need not be made bendable but may be made stiff and unbendable. In this case, there are no limits or restrictions on the maximum amount of finger-assisted razor bending, other than the inherent bending limits of the razor head's own construction.

Another example of a problem in said Prior Art was that the user's fingers had to first supply extra force to unbend the existing, curved, flexible ribs, in order to bend the flexible razor head. However, in the present invention, no extra force by the user's fingers is required because there are no curved ribs to unbend.

Although the descriptions set forth above in this present invention contain many specificities, these should not be construed as limiting the scope of the invention, but as merely providing illustrations of some of the presently preferred embodiments of this invention. The following examples of possible deviations from the embodiments set forth in the present invention should not limit the scope of the present invention:

(a) As a first example, some of the flexible razor embodiments displayed in the present invention show a number of razor head plus handle-shaped outlines that are rectangular, square or trapezoidal. However, other possible outlines can have other shapes such as circular, semi-circular, elliptical, triangular, etc.

(b) As a second example, a finger-grip-hole or loop, as shown in the center-rib of some of the flexible razor embodiments of this invention, can be any other means that is located in said center-rib that a user's finger can grip or manipulate. These other means, may be, for example, a pothole, a depression, a bump, a hook or appendage that may be C-shaped, J-shaped, I-shaped or L-shaped, etc.

(c) As a third example, some of the flexible razor embodiments displayed in the present invention show two living-hinges that connect two outer-ribs to a flexible razor head. However, at least one of said living-hinges may be replaced with a ball-joint or a fixed-joint in any of said embodiments.

(d) As a fourth example, some of the flexible razor embodiments displayed in the present invention show two living-hinges that connect two outer-ribs to a flexible rib-anchor. However, at least one of said living-hinges may be replaced with a ball-joint or a fixed-joint in any of said embodiments.

Thus, the scope of this invention should be determined by the appended claims and their legal equivalents, rather than only by the examples given.

What is claimed is:

1. A flexible razor system, comprising:
   a flexible razor head that is comprised of a cap-member plus a base-member plus at least one blade having a sharpened edge plus means for holding said cap-member, base-member and blade together;
   a handle that carries said flexible razor head, wherein said handle is comprised of at least three ribs plus a flexible rib-anchor, wherein said ribs carry said flexible razor head and said flexible rib-anchor carries said ribs, and wherein each one of at least three of said ribs has one end that is connected to said flexible razor head and has its other end connected to said flexible rib-anchor and wherein at least one of said ribs has one of its ends connected to the central region of said flexible razor head and has its other end connected to the central region of said flexible rib-anchor and wherein finger-manipulation of at least one of said ribs controls the bending of said flexible razor head.

2. The system of claim 1, wherein said ribs are comprised of at least one center-rib and at least two outer-ribs, wherein at least part of said at least one center-rib is located within a three-dimensional region between two of said outer-ribs.

3. The system of claim 1, wherein at least three of said ribs are parallel to each other.

4. The system of claim 1, wherein at least one of said ribs has one end fixedly connected to said flexible razor head and has its other end fixedly connected to said flexible rib-anchor.

5. The system of claim 1, wherein at least one of said ribs has one end connected to said flexible razor head via a hinge and has its other end connected to said flexible rib-anchor via a hinge.

6. The system of claim 1, wherein the outline of at least two of said ribs plus said flexible rib-anchor plus said flexible razor head encompasses a substantially rectangular to square outline-shape when viewed from a central region high above and perpendicular to the plane of at least two of said ribs via an elevational view.

7. The system of claim 1, wherein the outline of at least two of said ribs plus said flexible rib-anchor plus said flexible razor head forms a substantially trapezoidal outline-shape when viewed from a central region high above and perpendicular to the plane of at least two of said ribs via an elevational view.

8. The system of claim 1, wherein at least one of said ribs may be finger-manipulated by the user in order to bend said flexible razor head.

9. The system of claim 1, wherein at least one of said ribs has telescopic interconnections.

10. The system of claim 1, wherein said flexible rib-anchor is comprised of a flexible, springy, strip of material, with an added hinge at each opposite end-region of said flexible rib-anchor, wherein each said added hinge is individually connected to each one of at least two of said ribs.

11. The system of claim 1, wherein said flexible rib-anchor is comprised of a plurality of sub-housings that are separated from each other by at least one gap, wherein each said gap is filled by a web that acts as a living-hinge and thereby interconnects all of said plurality of sub-housings plus additional end-housings together to form a single, flexible rib-anchor with an added hinge at each opposite end-region of said single, flexible rib-anchor, wherein each said added hinge is individually connected to each one of at least two of said ribs.

12. The system of claim 1, wherein at least one of said ribs has one end connected to said flexible razor head via a hinge and has its other end fixedly connected to said flexible rib-anchor.

13. The system of claim 11, wherein said flexible rib-anchor has bending-limit-stops built into it via contacts between at least two of said flexible rib-anchor's sub-housings.

14. The system of claim 1, wherein said flexible razor head has bending-limit-stops built into it via contacts between at least two of said cap-member's sub-caps in one bending direction, and via contacts between at least two of said base-member's sub-bases in the opposite bending direction.

15. The system of claim 1, wherein said at least one blade has slotted mounting holes formed therein, which allows said blade to bend within pre-determined stop-limits, as set by the length of at least one of said slotted mounting holes.

16. The system of claim 5, wherein the hinge-axes of at least two of said hinges are parallel to each other.

17. The system of claim 9, wherein said telescopic interconnections also include a mechanism to enable opening or closing or holding-open said telescopic interconnections by employing cam-means.

18. The system of claim 5, wherein said flexible razor head is connected to at least one of said ribs a fixed distance in from the outer-end of said flexible razor head via said hinge.

19. The system of claim 1, wherein at least three of said ribs have telescopic interconnections, whereby a user is able to shave with said flexible razor system, either with said telescopic interconnections fully opened or fully closed.

20. The system of claim 2, wherein said at least one center-rib may be finger-manipulated by the user in order to bend said flexible razor head.

21. The system of claim 20, wherein said at least one center-rib has a hole for at least one finger.

22. The system of claim 20, wherein said at least one center-rib has at least one part that is wider than at least one part of said outer-ribs.

23. A flexible razor system, comprising:
   a flexible razor head that is comprised of a cap-member plus a base-member plus at least one blade having a sharpened edge plus means for holding said cap-member, base-member and blade together;
   a handle that carries said flexible razor head via at least two outer-ribs, wherein at least one of said outer-ribs is connected to one end-region of said flexible razor head, and wherein at least another one of said outer-ribs is connected to the opposite end-region of said flexible razor head, wherein said handle is comprised of said at least two outer-ribs plus a rib-anchor;
   a center-arm, one end of which is connected to said flexible razor head and the other end of said center-arm may be finger-manipulated in order to bend said flexible razor head.

24. The system of claim 23, wherein at least one of said outer-ribs is connected to said flexible razor head via a hinge.

25. The system of claim 23, wherein said center-arm has a finger-grip-hole for at least one finger that enables said center arm to be finger-manipulated in order to bend said flexible razor head.

26. The system of claim 23, wherein said center-arm has a rod-like end that enables it to be finger-pushed towards said flexible razor head so that said flexible razor head bends outwards in order to shave a concave surface.

27. The system of claim 23, wherein at least two of said outer-ribs may be finger-pushed towards each other in order to bend said flexible razor head.

28. The system of claim 23, wherein said center-arm has one end that is connected to said flexible razor head via a hinge and the other end of said center-arm may be finger-manipulated in order to bend said flexible razor head.

29. The system of claim 23, wherein said flexible razor head is constrained to move in a path that is substantially within the plane of said handle during flexing of said razor system, wherein the plane of said blade is set to be substantially perpendicular to the plane of said handle and said razor head is initially located substantially within the plane of said handle.

30. The system of claim 23, wherein said flexible razor head is constrained to move in a path that is askew to the plane of the handle during flexing of said flexible razor system, wherein the plane of said blade is set to be askew to the plane of said handle.

31. The system of claim 23, wherein the outline of said flexible razor head plus said handle encompasses a substantially rectangular to square outline-shape when viewed from a central region high above and perpendicular to the plane of at least two of said outer-ribs via an elevational view.

32. The system of claim 23, wherein the outline of said flexible razor head plus said handle forms a substantially trapezoidal outline-shape when viewed from a central region high above and perpendicular to the plane of at least two of said outer-ribs via an elevational view.

33. The system of claim 23, wherein said at least one blade has slotted mounting holes formed therein which allow said blade to bend within pre-determined stop-limits, as set by the length of at least one of said slotted mounting holes.

* * * * *